United States Patent
Rits et al.

(10) Patent No.: US 8,316,443 B2
(45) Date of Patent: Nov. 20, 2012

(54) METHOD AND SYSTEM FOR PROTECTING A MESSAGE FROM AN XML ATTACK WHEN BEING EXCHANGED IN A DISTRIBUTED AND DECENTRALIZED NETWORK SYSTEM

(75) Inventors: Maarten Rits, Nice (FR); Faisal Abdul Kadir, Dacca (BD)

(73) Assignee: SAP AG, Walldorf (DE)

( * ) Notice: Subject to any disclaimer, the term of this patent is extended or adjusted under 35 U.S.C. 154(b) by 919 days.

(21) Appl. No.: 12/122,283

(22) Filed: May 16, 2008

(65) Prior Publication Data

US 2008/0289039 A1 Nov. 20, 2008

(30) Foreign Application Priority Data

May 18, 2007 (EP) ..................................... 07290644

(51) Int. Cl.
*H04L 29/06* (2006.01)
(52) U.S. Cl. ............ 726/22; 726/23; 707/397; 707/398; 707/687; 370/401; 715/229; 715/234
(58) Field of Classification Search ..................... 726/22, 726/23; 707/397, 398, 687; 370/401; 715/229, 715/234
See application file for complete search history.

(56) References Cited

U.S. PATENT DOCUMENTS

| | | | | |
|---|---|---|---|---|
| 5,680,622 A * | 10/1997 | Even | ............................. | 717/154 |
| 6,981,040 B1 * | 12/2005 | Konig et al. | .................. | 709/224 |
| 7,174,328 B2 * | 2/2007 | Stanoi et al. | .................. | 707/713 |
| 7,529,793 B2 * | 5/2009 | Itoh et al. | ...................... | 709/203 |
| 7,552,125 B1 * | 6/2009 | Evans | .................................. | 1/1 |
| 7,904,710 B2 * | 3/2011 | Rits et al. | ...................... | 713/150 |
| 7,958,560 B1 * | 6/2011 | Guruswamy | ................... | 726/25 |
| 8,185,497 B2 * | 5/2012 | Vermeulen et al. | ........... | 707/626 |
| 2002/0040431 A1 * | 4/2002 | Kato et al. | ..................... | 713/168 |
| 2004/0054912 A1 * | 3/2004 | Adent et al. | .................. | 713/181 |
| 2004/0103105 A1 * | 5/2004 | Lindblad et al. | ............. | 707/100 |
| 2004/0139352 A1 * | 7/2004 | Shewchuk et al. | ............ | 713/201 |
| 2004/0205509 A1 * | 10/2004 | Lou | ............................. | 715/501.1 |
| 2004/0226002 A1 * | 11/2004 | Larcheveque et al. | ........ | 717/126 |
| 2006/0041579 A1 * | 2/2006 | Miyashita et al. | ............ | 707/102 |
| 2006/0095456 A1 * | 5/2006 | Sakai et al. | .................... | 707/101 |

(Continued)

OTHER PUBLICATIONS

Sinha et al., "A Formal Solution to Rewriting Attacks on SOAP Messages." Oct. 31, 2008. SWS '08 Proceedings of the 2008 ACM workshop on Secure web services. pp. 53-59.*

(Continued)

*Primary Examiner* — Nathan Flynn
*Assistant Examiner* — Sarah Su
(74) *Attorney, Agent, or Firm* — Brake Hughes Bellermann LLP

(57) ABSTRACT

A system may include an attack preventing creator module that is configured to create at least one attack preventing head block for a message having message elements in a tree structure with one or more of the message elements being signed, wherein the attack preventing header block includes structure specific information that comprises at least a digest value of a pre-order traversal list of the tree structure and for each signed message element a unique ID attribute, a depth, a parent's name and a parent's ID attribute. The system may include an attack preventing verifier module that is configured to verify the at least one attack preventing header block by comparing the structure specific information which can be derived from the message with the structure specific information carried by the first attack preventing header block.

31 Claims, 33 Drawing Sheets

U.S. PATENT DOCUMENTS

| | | | |
|---|---|---|---|
| 2007/0005786 A1* | 1/2007 | Kumar et al. | 709/230 |
| 2008/0005660 A1* | 1/2008 | Austel et al. | 715/513 |
| 2008/0263008 A1* | 10/2008 | Beyer et al. | 707/3 |
| 2008/0313234 A1* | 12/2008 | Chen et al. | 707/104.1 |
| 2009/0063533 A1* | 3/2009 | Ting | 707/102 |
| 2009/0089658 A1* | 4/2009 | Chiu et al. | 715/234 |
| 2009/0292726 A1* | 11/2009 | Cormode et al. | 707/103 Y |
| 2010/0082993 A1* | 4/2010 | Benameur et al. | 713/176 |

OTHER PUBLICATIONS

Rahaman, Mohammad A., et al., "An Inline Approach for Secure SOAP Requests and Early Validation", OWASP Europe Conference, Leuven, Belgium, (May 31, 2006), pp. 1-15.

Bhargavan, Karthikeyan et al., "A Semantics for Web Services Authentication", Technical Report, MSR-TR-2003-83 (Jan. 14, 2004).

Bhargavan, Karthikeyan et al., "An Advisor for Web Services Security Policies", Microsoft Research, Cambridge, ACM 1595932348/05/0011, (Nov. 11, 2005).

"Axis Architecture Guide", (Online) http://ws.apache.org/axis/java/architecture-guide.html.

"Samoa: Formal Tools for Securing Web Services", Microsoft Research; (Online) http://research.microsoft.com/projects/Samoa/, (Nov. 2, 2007).

"SOAP Version 1.2 Part 0: Primer (Second Edition)", W3C Recommendation, (Apr. 27, 2007), pp. 1-69.

Rahaman, Mohammad A., et al., "Towards Secure SOAP Message Exchange in a SOA", Workshop on Secure Web Services, Proceedings of the 3rd ACM Workshop on Secure Web Services, Alexandria, Virginia, (Online) http://portal.acm.org/citation.cfm?id=1180367.1180382 (2006), pp. 77-84.

Needham, Roger M., et al., "Using Encryption for Authentication in Large Networks of Computers", Communications of the ACM, vol. 21, No. 12, (Dec. 1978), pp. 993-999.

Bhargavan, Karthikeyan et al., "Verifying Policy-Based Security for Web Services", Technical Report, MSR-TR-2004-84, (Nov. 2005), pp. 1-52.

Della-Libera, Giovanni et al., "Web Services Security Policy Language (WS-SecurityPolicy)", Version 1.1, (Jul. 2005).

Bajaj, Siddharth et al., "Web Services Policy 1.2—Framework (WS-Policy)", http://www.w3.org/Submission/2004/SUBM-ws-addressing-20040810/, W3C Member Submission, (Apr. 25, 2006).

"Web Services Security: SOAP Message Security 1.0 (WS-Security 2004)", OASIS Standard 200401, (Mar. 15, 2004).

"Welcome to XML Security", Apache XML Security, (Online) http://xml.apache.org/security/, (May 9, 2007).

McIntosh, Michael et al., "XML Signature Element Wrapping Attacks and Countermeasures", IBM Research Report (Aug. 9, 2005).

"XML-Signature Syntax and Processing", W3C Recommendation; http://www.w3.org/TR/2002/REC-xmldsig-core-20020212/, (Feb. 12, 2002).

Dolev, D et al., "On the security of public key protocols", IEEE Transactions on Information Theory, IT, vol. 29, Issue: 2, (Mar. 1983), pp. 198-208.

Guest, Simon "WS-Security Interoperability Using WSE 2.0 and Sun JWSDP 1.4", http://msdn2.microsoft.com/en-us/library/ms954606.aspx, (Sep. 2004).

Extended European Search Report for EP Application No. 07290644.9 dated Oct. 16, 2007.

Decision to Grant a European Patent for EP Application No. 07290644.9, mailed Mar. 19, 2009, 2 pages.

Response to Communication under Rule 71(3) for EP Application No. 07290644.9, filed on Feb. 24, 2009, 18 pages.

Communication under Rule 71(3) for EP Application No. 07290644.9, mailed Dec. 18, 2008, 163 pages.

Office Action Response for EP Application No. 07290644.9, filed on Jan. 25, 2008, 16 pages.

Office Action for EP Application No. 07290644.9, mailed Nov. 30, 2007, 21 pages.

Rosenberg, et al, "Securing Web Services with WS-Security", Sams Publishing, May 12, 2004, 400 pages.

\* cited by examiner

```
<Envelope>
  <Header>
    <MessageID Id="Id-1">123</MessageID>
    <Security mustUnderstand="1">
      <BinarySecurityToken ValueType="#X509v3" Id="Id-2">
            abcdefg....</ >
      <Signature>
         <SignedInfo>
           <CanonicalizationMethod Algorithm="...xml-exc-c14n#"/>
             <SignatureMethod Algorithm="...#rsa-sha1" />
             <Reference URI="#Id-1">
               <Transforms>
                  <Transform Algorithm="...xm1-exc-c14n#" />
               </>
               <DigestMethod Algorithm="#sha1" />
               <DigestValue>4AFDE67...</ >
             </>
             <Reference URI="#Id-3">
               <Transforms>
                    <Transform Algorithm="...xml-exc-c14n#" />
               </Transforms>
               <DigestMethod Algorithm="...#sha1" />
               <DigestValue>EF346A.... </ ></ ></ >
         <SignatureValue>34EADB98... </ >
         <KeyInfo>
             <SecurityTokenReference>
                <Reference URI="#Id-2" ValueType="#X509v3" />
             </ ></ ></ ></ >
      <Body Id="Id-3">
        <AirlineTicketRequest>...</ AirlineTicketRequest ></ >
</>
```

*FIGURE 1.1*

```
<Envelope>
  <Header>
    <Irrelevant>
    <MessageID Id="Id-1">123</ ></ >
    <MessageID>324</ >
    <Security mustUnderstand="1">
        <BinarySecurityToken ValueType="#X509v3" Id="Id-2">
                abcdefg....</ >
        <Signature>
            <SignedInfo>
            <CanonicalizationMethod Algorithm="...xml-exc-c14n#"/>
                <SignatureMethod Algorithm="...#rsa-sha1" />
                <Reference URI="#Id-1 ">
                    <Transforms>
                        <Transform Algorithm="...xml-exc-c14n#" />
                    </ >
                    <DigestMethod Algorithm="#sha1" />
                    <DigestValue>4AFDE67...</ ></ >
                <Reference URI="#Id-3">
                  <Transforms>
                        <Transform Algorithm="...xml-exc-c 14n#" />
                  </>
                    <DigestMethod Algorithm="...#sha1" />
                    <DigestValue>EF346A.... </ ></ ></ >
            <SignatureValue>34EADB98...</ >
            <KeyInfo>
                <SecurityTokenReference>
                    <Reference URI="#Id-2" ValueType="#X509v3" />
                </ ></ ></ ></ ></ >
    <Body Id="Id-3">
      <AirlineTicketRequest>...</ AirlineTicketRequest >
    </></ >
```

*FIGURE 1.2*

```
<Envelope>
  <Header>
    <To id="id4">http://www.airlineticket.com</ >
    <Security mustUnderstand="1">
        <BinarySecurityToken ValueType="#X509v3" Id="Id-2">
                abcdefg....
        </BinarySecurityToken>
        <Signature>
            <SignedInfo>
              ...........
                <Reference URI="#Id-4">
                    <DigestMethod Algorithm="#sha1" />
                    <DigestValue>4AFDE67... </DigestValue>
                </Reference>
            </SignedInfo>
            <SignatureValue>34EADB98... </SignatureValue>
            <KeyInfo>
              .........
            </KeyInfo>
        </Signature>
    </Security>
  </Header>
  <Body Id="Id-3">
    <AirlineTicketRequest>...</ AirlineTicketRequest >
  </Body>
</Envelope>
```

*FIGURE 2.1*

```
<Envelope>
  <Header>
    <From>http://www.client.com</From>
    <To>http://www.stockquote.com</To>
    <Attack>
    <To id="id4">http://www.airlineticket.com</To>
    </Attack>
    <Security mustUnderstand="1">
    <BinarySecurityToken ValueType="#X509v3" Id="Id-2">
              abcdefg....
    </BinarySecurityToken>
      <Signature>
        <SignedInfo>
          ..........
          <Reference URI="#Id-4">
            <DigestMethod Algorithm="#sha1" />
            <DigestValue>4AFDE67... </DigestValue>
          </Reference>
        </SignedInfo>
        <SignatureValue>34EADB98...</SignatureValue>
        <KeyInfo>
          ..........
        </KeyInfo>
      </Signature>
    </Security>
  </Header>
  <Body Id="Id-3">
      <AirlineTicketRequest>...</ AirlineTicketRequest >
  </Body>
</Envelope>
```

*FIGURE 2.2*

```
<Envelope>
  <Header>
    <MessageID Id="Id-1"> 123</MessageID>
    <Security>
      <BinarySecurityToken Id="Id-2">
              abcdefg....
      </BinarySecurityToken>
        <Signature>
          <SignedInfo>
            ........
            <Reference URI="#Id-1">...... </Reference>
            <Reference URI="#Id-3">...... </Reference>
            <Reference URI="#Id-4">...... </Reference>
          </SignedInfo>
          <SignatureValue>34EADB98... </SignatureValue>
          <KeyInfo></KeyInfo>
        </Signature>
        <TimeStamp id = "id-4">
            <Created>T1 </Created>
            <Expires>T2</Expires>
        </TimeStamp>
    </Security>
  </Header>
  <Body Id="Id-3">
      <AirlineTicketRequest>...</ AirlineTicketRequest >
  </Body>
</Envelope>
```

*FIGURE 3.1*

```
<Envelope>
  <Header>
    <MessageID Id="Id-1">123</MessageID>
    <Security >
      <BinarySecurityToken Id="Id-2">
              abcdefg....
      </BinarySecurityToken>
      <Signature>
         <SignedInfo>
           .......
            <Reference URI="#Id-1">...... </Reference>
            <Reference URI="#Id-3">......</Reference>
            <Reference URI="#Id-4">...... </Reference>
         </SignedInfo>
         <SignatureValue>34EADB98... </SignatureValue>
         <KeyInfo></KeyInfo>
      </Signature>
      <TimeStamp>
        <Created>T1</Created>
        <Expires>T2</Expires>
      </TimeStamp>
    </Security>
    <Security role="none" mustUnderstand="0">
       <TimeStamp id = "id-4">
           <Created>T1</Created>
           <Expires>T2</Expires>
       </TimeStamp>
     </Security>
  </Header>
  <Body Id="Id-3">
      <AirlineTicketRequest>...</ AiriineTicketRequest >
  </Body>
</Envelope>
```

*FIGURE 3.2*

```
<soap:Envelope ...>
    <soap:Header>
      <wsse:Security>
        <ds:Signature>
           <ds:SignedInfo>
           <ds:Reference URI="#theBody"></ >
           <ds:Reference URI="#theReplyTo">
           </ ></ ></ ></ >
           <wsa:ReplyTo wsu:Id="theReplyTo>
<wsa:Address>http://good.com/</wsa:Address>
           </></>
<soap:Body wsu:Id="theBody">
<getQuote Symbol="IBM"/></ ></ >
```

*FIGURE 4.1* a) The element specified by
/soap:Evelope/soap:Body must
be referenced from a signature "S" using WSS
with XML Signature, and b) if present, any element matching
/soap:Envelope/soap:Header/wsa:ReplyTo must
be referenced from a signature "S" using WSS
with XML Signature, and c) the signature "S" verification key must be
provided by an X.509v3 certificate issued by one
of a set of trusted Certificate Authorities (CAs)

*FIGURE 4.2*

```
<soap:Envelope ...>
    <soap:Header>
      <wsse:Security>
      <ds: Signature>
        <ds:SignedInfo>
           <ds:Reference URI="#theBody"></ >
           <ds:Reference URI="#theReplyTo">
           </>
</></></>
<wrapper>
<wsa:ReplyTo wsu:Id="theReplyTo>
<wsa:Address>http://good.com/</wsa:Address>
</></></>
<soap:Body wsu:Id="theBody">
<getQuote Symbol="IBM"/>
</></>
```

*FIGURE 4.3*

```
<soap:Envelope ...>
    <soap:Header>
      <wsse:Security>
        <ds: Signature>
          <ds:SignedInfo>
            <ds:Reference URI="#theBody"></ >
            <ds:Reference URI="">
            <ds:Transforms>
              <ds:Transform
              Algorithm=".../REC-xpath-19991116">
              <ds:XPath...>
   /soap:Envelope/soap:Header/wsa:ReplyTo
              </ ></ ></ ></ ></ ></ >
<wsa:ReplyTo wsu:Id="theReplyTo>
<wsa:Address>http://good.com/</ >
</></>
<soap:Body wsu:Id="theBody">
<getQuote Symbol="IBM"/>
</></>
```

*FIGURE 4.4* a) the element specified by /soap:Evelope/soap:Body must be referenced from a signature "S" using WSS with XML Signature, and b) if present, any element matching /soap:Envelope/soap:Header/wsa:ReplyTo must be referenced via an absolute path XPath expression from a signature "S" using WSS with XML Signature, and c) the signature "S" verification key must be provided by an X.509v3 certificate issued by one of a set of trusted Certificate Authorities (CAs)

*FIGURE 4.5*

```
<soap:Envelope ...>
  <soap:Header>
    <wsse:Security>
      <ds:Signature>
      <ds:SignedInfo>
        <ds:Reference URI="#theBody"></>
        <ds:Reference URI="">
          <ds:Transforms>
            <ds:Transform Algorithm="..../REC-xpath-19991116">
              <ds:XPath ...>
              /soap:Envelope/soap:Header/wsse:Security/wsu:Timestamp
              </ ></ ></ ></ ></ >
<wsu:Timestamp wsu:Id="theTimestamp">
<wsu:Created>2005-05-29T08:45:00Z</wsu:Created>
<wsu:Expires>2005-05-29T09:00:00Z</wsu:Expires>
</></></ >
<soap:Body wsu:Id="theBody">
<getQuote Symbol="IBM"/></ ></ >
```

*FIGURE 4.6* a) the element specified by /soap:Evelope/soap:Body must be referenced from a signature "S" using WSS with XML Signature, and b) if present, any element matching /soap:Envelope/soap:Header/wsa:ReplyTo must be referenced via an absolute path XPath expression from a signature "S" using WSS with XML Signature, and c) if present, any element matching /soap:Envelope/soap:Header/wsse:Security/wsu:Timestamp must be referenced via an absolute path Xpath expression from a signature "S" using WSS with XMLSignature, and d) the signature "S" verification key must be provided by an X.509v3 certificate issued by one of a set of trusted Certificate Authorities (CAs)

*FIGURE 4.7*

```
<soap:Envelope ...>
  <soap:Header>
    <wsse:Security role="none" mustUnderstand="false">
    <wsu:Timestamp wsu:Id="theTimestamp">
<wsu:Created>2005-05-29T08:45:00Z</wsu:Created>
<wsu:Expires>2005-05-29T09:00:00Z</wsu:Expires>
    </>
  </>
  <wsse:Security>
    <ds:Signature>
    <ds:SignedInfo>
      <ds:Reference URI="#theBody"></>
      <ds:Reference URI="">
        <ds:Transforms>
          <ds:Transform Algorithm=".../REC-xpath-19991116">
            <ds:XPath ...>
      /soap:Envelope/soap:Header/wsse:Security/wsu:Timestamp
          </ ></ ></ ></ ></ ></ >
<wsu:Timestamp>
<wsu:Created>2006-05-29T08:45:00Z</wsu:Created>
<wsu:Expires>2006-05-29T09:00:00Z</wsu:Expires>
</></></ >
<soap:Body wsu:Id="theBody">
<getQuote Symbol="IBM"/></ ></ >
```

*FIGURE 4.8*

```
<Envelope>
  <Header>
    <MessageID Id="Id-1">123</MessageID>
    <Security mustUnderstand="1 ">
        <BinarySecurityToken Id="Id-2">
            abcdefg....</ >
        <Signature>
           <SignedInfo>
              .......
               <Reference URI="#Id-1">.... </ >
               <Reference URI="#Id-3">.... </ >
               <Reference URI="#Id-4">.... </ >
           <SignatureValue>34EADB98.... </ >
           <KeyInfo>
              <SecurityTokenReference>
                   <Reference URI="#Id-2" />
              </ ></ ></ ></ >
        <SoapAccount>
        <NoChildOfEnvelope>2</>
        <NoChildOfHeader>3</>
        <NoOfSigned>3</>
        <ParentOfId1>Header</>
        <ParentOfId3>Envelope</>
        <ParentOfId4>Header</>
       </>
    </>
    <Body Id="Id-3">
       <AirlineTicketRequest>...</ AirlineTicketRequest ></ >
</>
```

*FIGURE 5.1*

```
<Envelope>
  <Header>
    <Attack>
    <MessageID Id="Id-1">123</MessageID>
    </Attack>
    <MessageID Id="Id-1">234</MessageID>
    <Security mustUnderstand="1">
        <BinarySecurityToken Id="Id-2">
        abcdefg... .</ >
        <Signature>
            <SignedInfo>
            .......
                <Reference URI="#Id-1">.... </>
                <Reference URI="#Id-3">.... </ >
                <Reference URI="#Id-4">.... </ >
            <SignatureValue>34EADB98... </ >
            <KeyInfo>
                <SecurityTokenReference>
                    <Reference URI="#Id-2" />
            </ ></ ></ ></ >
        <SoapAccount>
        <NoChildOfEnvelope>2</>
        <NoChildOfHeader>3</>
        <NoOfSigned>3</>
        <ParentOfId1>Header</>
        <ParentOfId3>Envelope</>
        <ParentOfId4>Header</>
        </>
    </>
    <Body Id="Id-3">
        <AirlineTicketRequest>...</ AirlineTicketRequest ></ >
</ >
```

*FIGURE 5.2*

```
<soap:Envelope>
<soap:Header>
        <wsse:Security>
          <wsse:BinarySecurityToken wsu:Id="4"></ >
        <ds:Signature>
           <ds:SignedInfo>
              <ds:Reference URI="#1">...</ >
              <ds:Reference URI="#2"></ >
              <ds:Reference URI="# 3 "></ >
           </ >
           <ds:SignatureValue></ >
           <ds:KeyInfo>...</ >
        </ >
        <wsu:Timestamp wsu:Id="3">
           <wsu:Created>t1</wsu:Created>
           <wsu:Expires>t2</wsu:Expires>
        </></ >
        <Option>abdbdbd</ >
        <SOAPAccount ID = "2">
            <NoChildOfEnvelope>2</>
            <NoOfHeader>3</>
            <NoOfReferences>3</>
            <ParentOfID1>Envelope</>
            <ParentOfID2>Header</>
            <ParentOfID3>Security</>
            <SiblingOfID1>Header</>
            < SiblingOfID2> Security,Option</>
            < SiblingOfID3>Signature,BST</>
        </></ >
<soap:Body wsu:Id="1">..<getQuote Symbol="IBM"/>
</></ >
```

*FIGURE 5.3*

```
<soap:Envelope>
<soap:Header>
        <wsse:Security>
            <wsse:BinarySecurityToken wsu:Id="4"></ >
        <ds:Signature>
            <ds:SignedInfo>
                <ds:Reference URI="#1">...</ >
                <ds:Reference URI="#2"></ >
                <ds:Reference URI="# 3"></ >
            </ >
            <ds:SignatureValue>...</ >
            <ds:KeyInfo></ >
        </ >
        <wsu:Timestamp>
            <wsu:Created>t3</wsu:Created>
            <wsu:Expires>t4</wsu:Expires>
        </></ >
     <Option role="none" mustUnderstand = "0">
        <wsse:Security>
            < wsse:BinarySecurityToken/>
            < ds:Signature/>
            <wsu:Timestamp wsu:Id="3">
               <wsu:Created>t1</wsu:Created>
               <wsu:Expires>t2</wsu:Expires>
            </></ >
     </ >
        <SOAPAccount ID = "2">
          <NoChiidOfEnvelope>2</>
          <NoOfHeader>3</>
          <NoOfReferences>3</>
          <ParentOfID1>Envelope</>
          <ParentOfID2>Header</>
          <ParentOfID3>Security</>
          <SiblingOfID 1>Header</>
         < SiblingOfID2> Security,Option</>
         < SiblingOfID3>Signature,BST</>
        </></ >
  <soap:Body wsu:Id="1">..<getQuote Symbol="IBM"/>
</></ >
```

*FIGURE 5.4*

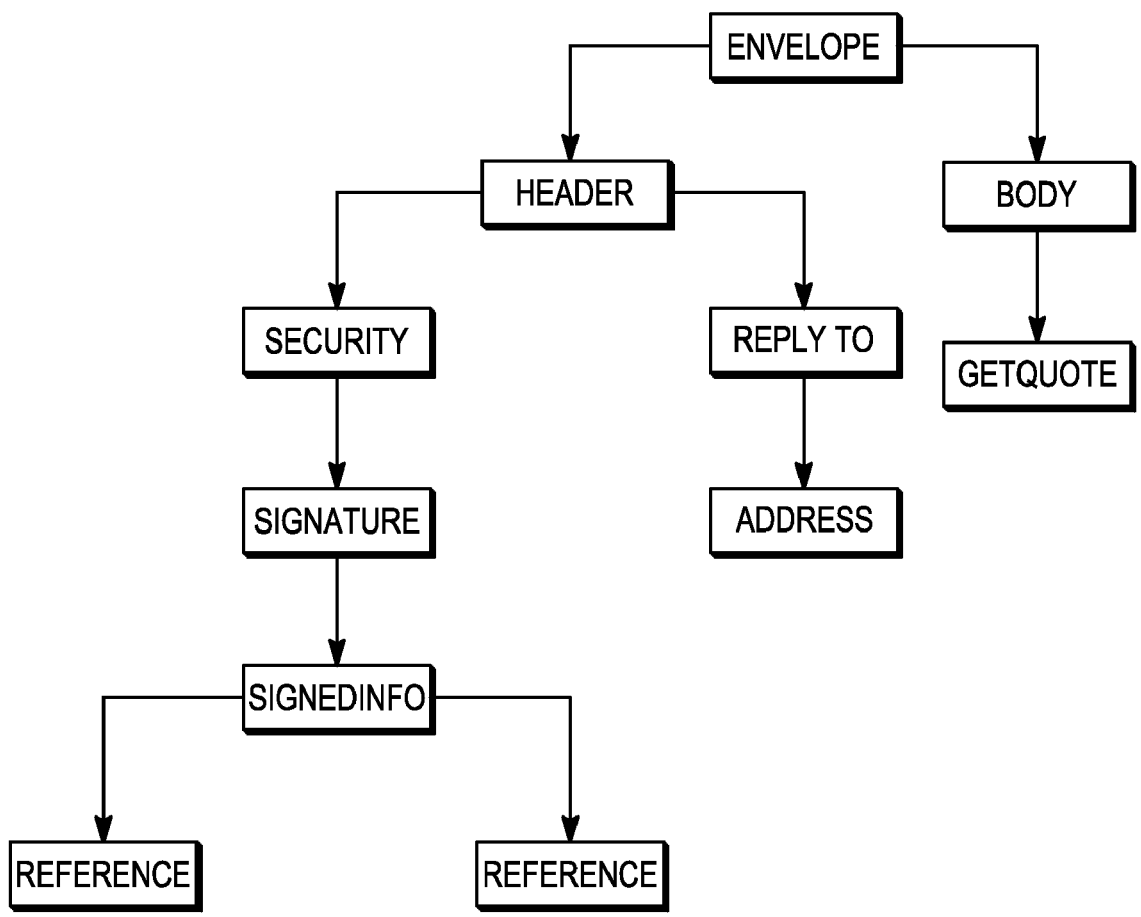
FIGURE 6.1

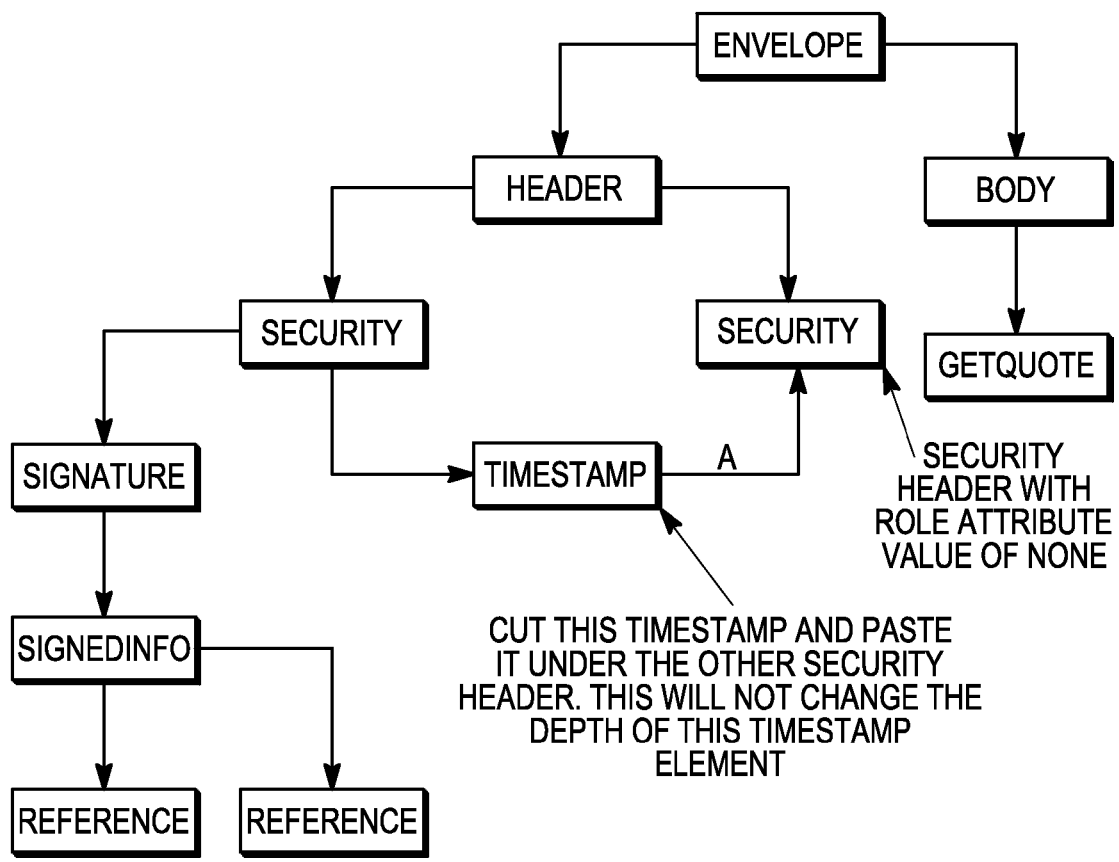
FIGURE 6.2

```xml
<RewritingHealer ID="" Role="" NodeNumber="">
    <Time></Time>
    <MessageID></MessageID>
    <SignedElementInfo>
        <ID></ID>
        <Depth></Depth>
        <ParentName></ParentName>
        <ParentID></ParentID>
    </SignedElementInfo>
    <TraversalDigest>
        <DigestValue></DigestValue>
    </TraversalDigest>
</RewritingHealer>
```

FIGURE 11

```xml
<Envelope>
  <Header>
      <A Id="Id-1 ">123</A>
      <D id="Id-4"> .... </D>
      <B id="0.1.1"><C id="0.1.2"> .....</C></B>
      <Security id = "0.1.6">
      <BinarySecurityToken Id="0.1.4">
      abcdefg....
      </BinarySecurityToken>
        <Signature>
            <SignedInfo>
                <Reference URI="#Id-1">...... </Reference>
                <Reference URI="#Id-4">...... </Reference>
            </SignedInfo>
        </Signature>
      </Security>
  </Header>
  <RewritingHealer ID="5" NodeNumber="0" Role="1">
  <MessageID>1</MessageID>
  <Time>tttt</Time>
  <SignedElementInfo>
     <ID>Id-1</ID><Depth>2</Depth><PID>H</PID>
     <Pname>Header</Pname>
  </SignedElementInfo>
  <SignedElementInfo>
     <ID> Id-4</ID><Depth>2</Depth><PID>H</PID>
     <Pname>Header</Pname>
  </SignedElementInfo>
     <DigestMethod>SHA-256</DigestMethod>
     <DigestValue>XYZUSDF</DigestValue>
  </RewritingHealer>
  <Body Id= "0.1.6">
       <G Id= "0.1.7"> ...</ G >
  </Body>
</Envelope>
```

*FIGURE 12.1*

```
<Envelope>
  <Header>
    <D id="Id-4">.... <ID>
    <A Id="Id-1">123</A>
    <B id="0.1.1"><C id="0.1.2"> .....</C></B>
    <Security id = "0.1.6">
      <BinarySecurityToken Id="0.I.4">
              abcdefg....
      </BinarySecurityToken>
      <Signature>
         <SignedInfo>
            <Reference URI="#Id-1">...... </Reference>
            <Reference URI="#Id-4">...... </Reference>
         </SignedInfo>
      </Signature>
    </Security>
  </Header>
  <RewritingHealer ID="5" NodeNumber="0" Role="1">
    <MessageID>1</MessageID>
    <Time>tttt</Time>
    <SignedElementInfo>
       <ID>Id-1</ID><Depth>2</Depth><PID>H</PID>
       <Pname>Header</Pname>
    </SignedElementInfo>
    <SignedElementInfo>
       <ID> Id-4</ID><Depth>3</Depth><PID>0.I.6</PID>
       <Pname>Security</Pname>
    </SignedElementInfo>
       <DigestMethod>SHA-256</DigestMethod>
       <DigestValue>MNOPQR</DigestValue>
  </RewritingHealer>
   <Body Id= "0.1.6">
     <G Id= "0.1.7">...</ G >
   </Body>
</Envelope>
```

*FIGURE 12.2*

```xml
<Envelope>
  <Header>
    <A Id="Id-1" role="next">123</A>
    <B id="0.1.1">
        <C id="0.1.2">.....</C><D id="Id-4">.... </D>
    </B>
      <Security id = "0.1.6">
      <BinarySecurityToken Id="0.I.4">
                abcdefg ....
      </BinarySecurityToken>
      <Signature>
            <SignedInfo>
                <Reference URI="#Id-1">...... </Reference>
                <Reference URI="#Id-4">...... </Reference>
            </SignedInfo>
          </Signature>
      </Security>
  </Header>
  <RewritingHealer ID="5" NodeNumber="0" Role="1">
    <MessageID>1</MessageID>
    <Time>tttt</Time>
    <SignedElementInfo>
       <ID> Id-4</ID><Depth>3</Depth><PID>0.1.1</PID>
       <Pname>B</Pname>
    </SignedElementInfo>
       <DigestMethod>SHA-256</DigestMethod>
       <DigestValue>XYZUSDF</DigestValue>
    </RewritingHealer>
    <RewritingHealer ID="6" NodeNumber="0" Role="2">
    <SignedElementInfo>
       <ID> Id-1</ID><Depth>2</Depth><PID>H</PID>
       <Pname>Header</Pname>
    </SignedElementInfo>
    <DigestMethod>SHA-256</DigestMethod>
       <DigestValue>XYZUSDF</DigestValue>
    </RewritingHealer>
    <Body Id= "0.1.6">
        <G Id= "0.1.7">...</ G >
    </Body>
</Envelope>
```

*FIGURE 13.1*

```
<Envelope>
  <Header>
    <A Id="Id-1" role = "next">123</A>
    <B id="0.1.2"> <D id="Id-4">.... </D></B>
    <B id="0.1.1"> </B>
      <Security id = "0.1.6">
      <BinarySecurityToken Id="0.1.4">
      abcdefg....
      </BinarySecurityToken>
        <Signature>
           <SignedInfo>
              <Reference URI="#Id-1">...... </Reference>
              <Reference URI="#Id-4">...... </Reference>
           </SignedInfo>
        </Signature>
      </Security>
  </Header>
  <RewritingHealer ID="5" NodeNumber="0" Role="1">
    <MessageID>1</MessageID>
    <Time>tttt</Time>
    <SignedElementInfo>
       <ID> Id-4</ID><Depth>3</Depth><PID>0.1.1</PID>
       <Pname>B</Pname>
    </SignedElementInfo>
       <DigestMethod>SHA-256</DigestMethod>
       <DigestValue>XYZUSDF</DigestValue>
    </RewritingHealer>
    <RewritingHealer ID="6" NodeNumber="0" Role="2">
    <SignedElementInfo>
        <ID>Id-I</ID><Depth>2</Depth><PID>H</PID>
        <Pname>Header</Pname>
    </SignedElementInfo>
        <DigestMethod>SHA-256</DigestMethod>
        <DigestValue>XYZUSDF</DigestValue>
    </RewritingHealer>
    <Body Id= "0.1.6">
      <G Id= "0.1.7"> ...</ G >
    </Body>
</Envelope>
```

*FIGURE 13.2*

```
public void invoke ( MessageContext mcnxt ) throws AxisFault{
        ////   Boolean variable that indicates whether
        ///a message is tampered or not
        boolean tampered = false ;

////Retrieve the SOAPMessage form the message context
        S0APMessage Messg = mcnxt.getRequestMessage();

////Get the parts of the message
        SOAPPart part =messg.getSOAPPart();
        try{
          ////Retrieves the envelope
          envelope = part.getEnvelope () ;

////This vector data structure contains all the
          ///determined roles for a node
          my_role_set.clear();
          ////This vector data structure contains all the
RewritingHealer
          ///header of a SOAP message
          rhset.clear();

////This hashmap data structure contains all the Ids
          /// of the signed elements of this SOAP message signedidlist.clear();

////This hashmap data structure contains all the Ids present
          ///under the <SignedInfoElement> elements of a particular
          ///RewritingHealer header element cursignedidlist.clear();

////This method determines the role set for a node
          determineRoleSet ( ) ;

////Display the SOAP message in the GUI
          this.gui.setRecievedMessage(envelope.toString());

////Create
          this.createSignedIDList();

/////Retrieve all rewriting healer from the SOAP message
          this.retrieveAllRewritingHealer();

////Verify whether the message is tampered or not
          if( !verify()){
                Msg += "Message Tampered\n";

tampered =true;
          }else{
                msg += "Message was not Tampered\n";
          }

}catch( Exception e ){
          this.gui.setRecievedMessage(e.toStrinq());
          }

///Display the GUI of the rewriting healer
          gui.setVisible(true);
```

*FIGURE 14.1*

```
public boolean verify(){
    /////For each role of this node
    for( int i = 0 ; i < my_role_set.sine( ); i++ ){
        ///Determine the role
        String cur_role = (String)my_role_set.get(i);
        ////Map the role name to an integer value
        int irole = this.mapRole(cur_role);

////Retrieve all rewriting healer with this role
        Vector rh = this.retrieveRewritingHealer(irole);

///For each rewriting healer with irole for( int j = 0 ; j < rh.sine(); j++ ){

///Take the RewritingHealer as a SOAP element
            SOAPElement sel = (SOAPElement)rh.get(j);

///Clear cursignedlist vector
            cursignedidlist.clear();

///Verify whether the information present in this
            ///RewritingHealer is correct or not
            if( !verifyRewritingHealer(sel)) return false;
        }
    }
    return true;
}
```

*FIGURE 14.2*

```
Public SOAPEnvelope invoke ( SOAPEnvelope env ){
    try{
        ////This hashmap datastructure will keep all the Ids present
        ///in the current envelope
        idlist.cleer();
        ////This hashmap data structure will keep all the Ids of the
        //Signed Elements of the current envelope
        Signedidlist.clear();
        ////This hashmap data structure will keep the Ids of signed
        ///Elements that was signed by some previous node
        prevsignedidlist.clear();
        ////This vector data structure will keep the Ids of
        ///all the Ids of RewritingHealer header added by
        ///this node
        added_rewriting_healer.clear();

///This variable is used to generate unique Ids
        counter= 0;

this.envelope = env;

/////Determine the node number
        node_number=findNodeNumber();

////This method creates a list of Ids of all the Signed
        ///Elements that is present in the current envelope
        createSignedIDList();

////This method creates a list of Ids of all the Signed
        ///that was signed by some previous node
        createPrevSignedIDList();

////Retrieve the header of the current envelope
        javax.xml.soap.SOAPHeader hdr = envelope.getHeader();

////Put all the Ids of elements present in this header
        createExistingIDList(hdr);

////Retrieve the body of the current envelope
        javax.xml. Soap.SOAPBody body = envelope.getbody();
        ////Put all the Ids of elements present in this body
        createExistingIDList(body);

////Provide Id to all unsigned elements of Header
        addIdAttr(hdr,1);
        ////Provide Id to all unsigned elements of Body
        addIdAttr(body,1);

////Create RewritingHealer for role UltimateReciepient
        createRewritingHealer ("UltimateReciever");
        ////Create RewritingHealer fox role Next
        createRewritingHealer ( "next") ;
        ////Create RewritingHealer for role none
        createRewritingHealer ("none ") ;

///Sign all created RewritingHealer using xpath
        this.signRewritingHealer();

///Return the envelope to the client application
        return this. envelope;

}catch( Exception e ){
        System.out.println(e);
        writeToLog (e);
    }
    return null;
}
```

*FIGURE 14.3*

```
package com.thesis.service;

public class MathService {
    public long add(long a, long b ){
        return a+b;
    }
    public long subtract( long a , long b ){
        return a-b;
    }
    public long multiply( long a , long b ){
        return a*b;
    }
    public long divide( long a , long b ){
        return a/b;
    }
    public long exponent( long a , long b ){
        return (long)Math.pow((double)a, (double)b) ;
    }
}
```

*FIGURE 15*

FIGURE 16.1

FIGURE 16.2

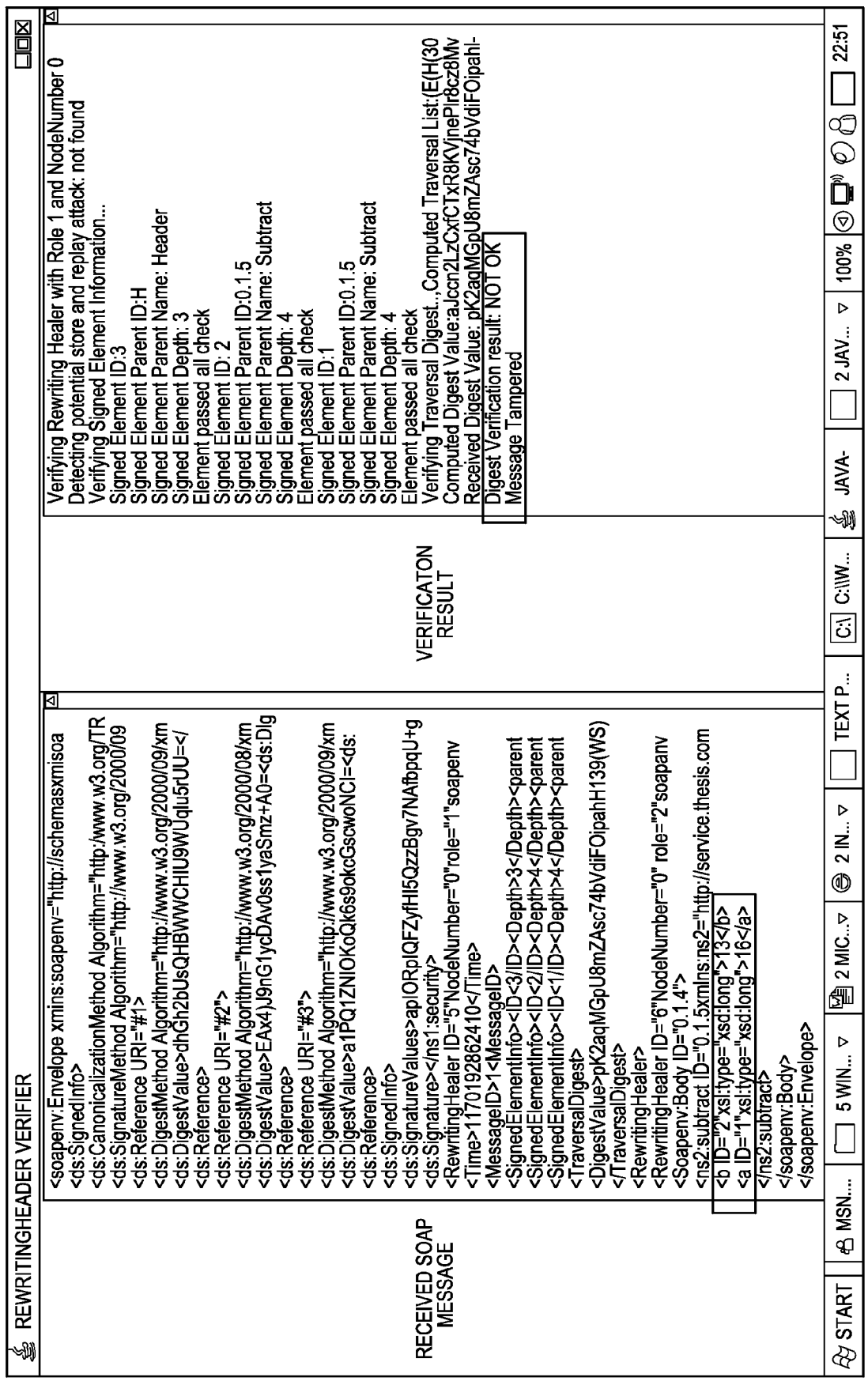
FIGURE 16.3

METHOD AND SYSTEM FOR PROTECTING A MESSAGE FROM AN XML ATTACK WHEN BEING EXCHANGED IN A DISTRIBUTED AND DECENTRALIZED NETWORK SYSTEM

CROSS-REFERENCE TO RELATED APPLICATION

This application claims priority under 35 U.S.C. §119 to European Patent Application EP07290644.9, filed May 18, 2007, titled "METHOD AND SYSTEM FOR PROTECTING A MESSAGE FROM AN XML ATTACK WHEN BEING EXCHANGED IN A DISTRIBUTED AND DECENTRALIZED NETWORK SYSTEM," which is incorporated herein by reference in its entirety.

TECHNICAL FIELD

This description relates to the field of distributed systems technology, particularly to protecting a Simple Object Access Protocol (SOAP) message or a similarly structured message from an XML attack when being exchanged in a distributed and decentralized network system.

BACKGROUND

Web services are a distributed systems technology where network endpoints exchange a specific form of XML document called a SOAP envelope which may contain a body element containing a request, response, or fault element, together with an optional header element containing routing or security information. In the broader sense, a SOAP envelope also may be designated as a SOAP message. Further details about SOAP can be found in "SOAP Version 1.2 Part 0 Primer W3C Recommendation". SOAP allows the existence of so-called network intermediaries. An intermediary may be a router or a firewall. SOAP may allow these intermediaries to process a SOAP envelope, by adding or modifying headers. In the following such a processing will be stated as an extension of the SOAP envelope. Examples of web services include Internet-based services for ordering goods or invoking search engines, and intranet-based services for linking enterprises as described in "A Semantics for Web Services Authentication, Karthikeyan Bhargavan, Cedric Fournet, Andrew D. Gordon, February 2004, Technical Report, MSR-TR-2003-83".

Because of its simplicity, standardization and platform independent nature, a lot of business organizations have embraced web service technology for an integration of data, system and application inside and outside their organization boundary. Due to this growing adoption by different organization, security of web services became a vital issue.

One way for securing SOAP exchanges can be relying on a transport level security like Transport Layer Security/Secure Sockets Layer (TLS/SSL). This might work well in many situations, however it may not be suitable for every situation due to its point-to-point security nature. TLS/SSL creates a security tunnel between respective two communication end points. Integrity and confidentiality of a SOAP message may be ensured as long as the message exists inside this tunnel but not subsequently in files or databases, and they may not match the security requirements of a corresponding application. For instance, client authentication may be performed by the application rather than by TLS/SSL. Besides, SSL does not fit SOAP's message-based architecture: intermediaries cannot see the contents of the tunnel, and so cannot route or filter messages. This phenomenon is further described in "A Semantics for Web Services Authentication, Karthikeyan Bhargavan, Cédric Fournet, Andrew D. Gordon, February 2004, Technical Report, MSR-TR-2003-83".

To overcome the above limitation of transport level security, Microsoft, along with IBM and VeriSign came up with a new security framework that can be used to achieve end-to-end security in web service communication. This security framework is named as WS-Security (Web Service-Security). WS-Security specifies how security elements like encrypted data, signed data and security tokens like username, X.509 certificate, etc., can be embedded in a SOAP message which is the usual vocabulary for web service communication.

After the emergence of WS-Security a number of standards on top of this have been proposed to take care of different security aspects of web service communication. WS-Security Policy along with WS Policy attachment provide a standard way to specify the security requirements of a web service. WS-Secure conversation specifies ways for securing not only a single SOAP message but also a whole session between a client and a server. WS-Trust specifies how security tokens can be requested, issued and verified.

Despite all of these security specifications, web services may still be vulnerable to a class of attacks, first described by Needham and Schroeder "R. Needham and M. Schroeder. Using encryption for authentication in large networks of computers. Commun. ACM, 21(12):993-999, 1978" and first formalized by Dolev and Yao "D. Dolev and A. Yao. On the security of public key protocols. IEEE Transactions on Information Theory, IT-29(2): 198-208, 1983", where an attacker may intercept, compute, and inject messages, but without compromising the underlying cryptographic algorithms. In the terminology of web service security, this sort of attack is called XML rewriting attacks, as opposed to attacks on web services implementations, such as buffer overruns or Structured Query Language (SQL) injection. As described in "K. Bhargavan, C. Fournet, and A. D. Gordon. Verifying policy-based security for web services. In 11th ACM Conference on Computer and Communications Security (CCS '04), pages 268-277, October 2004", WS-Security adopted XML Digital Signature and XML Encryption mechanism, designed for a general XML document, to provide integrity and confidentiality in SOAP communication. XML Digital Signature refers to a signed object of an XML document in a way that does not take care of the location of that object. SOAP extensibility model allows a SOAP message to contain a SOAP header element that is not recognized by a receiver. WS-Security allows multiple security headers to exist in the same SOAP message. All of these features along with the weakness of XML Digital Signature work as a weapon for performing an XML rewriting attack on SOAP messages.

WS-Security Policy, if used correctly, may be used to guard against an XML rewriting attack. However, most of the policy configuration files are hand written. Therefore, they may be error prone. Moreover, due to the flexibility provided by SOAP extensibility model it is hardly possible to prevent attacks where the corresponding attacker moves a signed element under another unknown element.

The word cryptography means the art of secret writing. It is a procedure of transforming information from its original format to a format that is not easily understandable. To get back the original information from the transformed one a secret method has to be used. Cryptography may be used for communication between participants in a way that prevents other from reading it.

In the terminology of cryptography a message that is to be transformed is called the plaintext and the resulting message generated after transformation is called the ciphertext. The mechanism of transforming a plaintext into ciphertext is called encryption and the mechanism of getting back the plaintext from the ciphertext is called decryption.

Two types of cryptographic procedure may be commonly used:
i) Symmetric key cryptography
ii) Public key cryptograph To secure a communication using symmetric key cryptography, parties involved in the communication share a secret key. This shared key is used both for encryption and decryption of the message exchanged among the communicating parties. As the same key is used for both encryption and decryption, this cryptographic procedure is called symmetric key cryptography. It is also may be referred to as shared key cryptography.

The main idea of public key cryptography is that a key will be composed of two parts. If a message is encrypted using one part of a key, then it can be decrypted using only the other part. In the terminology of public key cryptography the two parts of a key are called public key and private key. The public key, as its name implies, may be published in public. That means anyone can know it. However, the private key, as its name implies, may be totally private. That is only the owner of the key will know it.

Digital Signature is a mechanism for signing a document electronically. It may be used by a recipient of a document to authenticate the identity of the corresponding sender of the document. It also may be used to check the integrity of the received document. By verifying the integrity of the received document the receiver can be assured that the document has not been forged by an adversary on its way from the respective sender to the receiver.

When a sender wants to send a digitally signed message "m" to a receiver, it may go through the following operations:
i) It generates a message digest MD using an appropriate hash method H of the plaintext message m. The message digest MD of a plaintext message x is represented by H(x). So the sender first generates MD=H(m) for the plaintext message m.
ii) It then encrypts the message digest MD using its own private key and generates MD-1, where MD-1 represents the encrypted message digest.
iii) It appends the encrypted message digest MD-1 with the plaintext message m and generates the message m|MD-1.
iv) It sends m|MD-1 to the receiver.

When a receiver receives a message M=m|MD-1 from a sender, it goes through the following operations:
i) It extracts the whole message M=m|MD-1 into its sub-components. That means that it divides the whole message M into m and MD-1.
ii) It generates a message digest MD_1 of the received message m.
iii) It decrypts the received encrypted message digest MD-1 and generates MD_2.
iv) It compares the two message digest MD_1 and MD_2. If the two message digests are the same, then the message has not been forged on its way and the sender is the one who it supposed to be. Otherwise either the message has been forged or the identity of the sender is not valid.

One issue in using secret key cryptography is the distribution of the secret key among the communicating parties. If a person called Bob wants to send a message to another person called Alice using symmetric key cryptography, then both Bob and Alice need to share a common secret key. However, this secret key has to be exchanged between them in a secure way. If this secret key is intercepted by a middleman during the exchange, the communication between Bob and Alice with this secret key will not remain secret anymore. A middleman might intercept all the messages exchanged between them and would be able to decrypt and read the messages.

To overcome this key management issue, the idea of public key cryptography emerged. In public key cryptography, a key consists of two parts, namely a public part and a private part. The public part of the key may be known to all. However, the private part may only be known to the owner. Furthermore, if a message is encrypted using a public or private key, then the message can only be decrypted using the respective private or public key. This idea has immensely simplified the key management problem. Now, the participants don't have to exchange any secret key. However, all they have to know is the public key of the party to whom he/she wants to send a secret message. And as this public key may be known to all, the sender can just grab the public key and start the communication.

One of the limitations of the existing public key cryptographic procedure is that they are computationally expensive. Digital envelope is a framework, which tries to combine the advantages of the above mentioned cryptographic services.

A digital envelope may include a message encrypted using a secret key cryptography and an encrypted secret key. Normally, digital envelope may use public key cryptography to encrypt the secret key.

In the following, it is supposed that a sender wants to send a message M to a receiver using digital envelope. Then he will go through the following operations:
i) The sender may choose a random secret key to encrypt the message M.
ii) The sender may encrypt the message using the secret key chosen.
iii) The sender may take the receiver's public key to encrypt the secret key.
iv) The sender may encrypt the secret key with the receiver's public key.
v) The sender may append the encrypted secret key with the encrypted message and will send it to the receiver.

When a receiver receives the message it may go through the following operations:
i) The receiver may extract the message into its sub parts. That is, it may retrieve the encrypted message and the encrypted secret key.
ii) The receiver may decrypt the encrypted secret key using its private key to get the secret (symmetric) key.
iii) The receiver may use the decrypted symmetric key to decrypt the encrypted message to get the message M.

The digital envelope has the following advantages over the symmetric and public key cryptographic procedure:
i) It may simplify the key management procedure, which is the main limitation in using symmetric key cryptography.
It increases the performance. Now the whole message, which can be of variable length, need not be encrypted using Public key cryptography. However, the message itself is encrypted using a secret key and the secret key, which is usually much smaller in size than the message, is encrypted using public key cryptography.

A so-called hash also may be referred to as a message digest. It is a one-way function that takes as input a variable length message and generates a fixed length hash value. This function can be called one-way as it is possible to generate output y for input x with this function; however, it is not practically possible to get back input x from output y.

The hash of a message m is denoted in the following as h(m). Then h(m) may contain the following properties:

i) h(m) may be relatively easy to compute for any given message m. That means it may not consume a lot of processing time to compute the hash h(m) for any message m.
ii) Given h(m), there is no way to find an m that hashes to h(m) in a way that is substantially easier than going through all possible values of m and computing h(m) for each one.
iii) From the definition of hash it may be obvious that more than one message m will map to the same hash value h(m). However, it should be computationally infeasible to find two messages that map to the same hash value.

Hashing has an important role in security world. It may be used to check the integrity of a transmitted message. It also may be used to verify the authentication of the respective sender.

There are a number of hashing algorithms that may be used (e.g., SHA-1, SHA-224, SHA-256, SHA-512, etc). These hashing algorithms are called secure hash algorithms. The numbers associated with the name of the hash algorithms indicate the length of the output in bits. For instance, SHA-256 means, this algorithm will take a variable length message as input and will produce a 256 bit message digest.

SOAP (Simple Object Access Protocol) is a lightweight protocol for exchanging structured data in a decentralized and distributed environment. As described in "SOAP Version 1.2 Part 0 Primer W3C Recommendation," SOAP provides an extensible messaging framework using XML technologies. It defines a message construct that can be exchanged over a variety of underlying protocols. The framework has been designed to be independent of any particular programming model and other implementation specific semantics.

The SOAP messaging framework may include the following, which will be described subsequently in this section.
i) SOAP Message Construct
ii) SOAP Processing Model
iii) SOAP Extensibility Model
iv) SOAP Protocol Binding
v) SOAP Message Construct A SOAP message may be encoded as an XML document. Each SOAP message may include one root element, which is called <Envelope> element. The <Envelope> element contains the following sub elements as its children.
i) An optional <Header> element.
ii) A mandatory <Body> element.

A <Header> element may include data that is not an application payload. This element is intended to be processed by zero or more intermediaries along the path of the SOAP message from initial sender to ultimate receiver. The <Header> element may include zero or more <HeaderBlock> as its child element. Each <HeaderBlock> within the <Header> element may realize zero or more features. For instance, to realize the security feature, which is not specified by the Core SOAP Processing model, a <Security> header block may be used as a sub element of the <Header>.

The <Body> element may include the application payload. The <Body> element may be processed by the ultimate receiver of the SOAP message.

The SOAP processing model as described in "SOAP Version 1.2 Part 0 Primer W3C Recommendation" specifies how a SOAP receiver processes a SOAP message. SOAP specifies a distributed processing model. The initial sender generates a SOAP message, which is reached to the ultimate SOAP receiver via zero or more so-called SOAP nodes. The distributed processing model of SOAP can be used to support a number of different MEP (Message Exchange Pattern) like One-Way Message, Peer-to-Peer conversation or Request/Response interaction.

When a SOAP message passes on its way from the initial sender to the ultimate receiver, the SOAP nodes, called in the following intermediaries, between the sender and the receiver along with the receiver node process this SOAP message conforming to the SOAP Processing model Specification.

After the reception of a SOAP Message, a SOAP node tries to determine the parts of that message that are targeted to it. This determination may be done by the use of a "role" attribute of a SOAP header block.

If a SOAP node finds that the value of the role attribute of a header block is the role that it assumes, then this block is targeted to it. A role is specified in the header block using URI (Uniform Resource Identifier). SOAP defines 3 standard roles that can be assumed by a SOAP node. These standard roles are indicated as "Next", "Ultimate Receiver" and "None".

Beside these standard SOAP defined role attributes, an application may also define its own application specific role.

Once the SOAP node finds out all the parts of a SOAP message targeted to it, it will try to process them. SOAP nodes may not be obliged to process or understand all the message parts targeted to it. SOAP specifies another attribute "misunderstand" for the header block. If this attribute's value is true in a header block, the targeted SOAP node may be obliged to understand and process that block. This sort of header block is called a mandatory header block. If a SOAP node finds a mandatory header block targeted to it, however, it cannot process it according to the specification of the header block, it will generate a SOAP fault and will cease the relaying of this message further.

After the successful processing of a header block, colloquially the SOAP node removes the block from the outgoing message. However, there are circumstances where the node might have to retain the block in the outgoing message. One of the reasons for retaining a header block in the outgoing message is the semantics of the header block. That is if the specification of the header block mandates the presence of this header block in the forwarded message. Another reason is, if the header block contains the "relay" attribute with a value of true. As it is said before, a SOAP node is not obliged to process all the header blocks targeted to it.

However, even if it does not process a non-mandatory header block targeted to it, it may remove the block from the outgoing message. If a non-mandatory header block is wanted to be processed by the first SOAP node that assumes a particular role and understands this header block, this relay attribute is to be used in that header block with a value of true. In this case a SOAP node that assumes the role specified in the header block, even though it cannot process the block, it may retain it in the outgoing message.

A SOAP message can be exchanged between two SOAP nodes using a number of different protocols. For instance, it can be exchanged using hypertext transfer protocol (HTTP), or using simple mail transfer protocol (SMTP) or even using transmission control protocol (TCP) or user datagram protocol (UDP). SOAP protocol binding specifies how a SOAP message can be exchanged between two adjacent SOAP nodes using an underlying protocol.

When a SOAP sender needs to send a SOAP message to another SOAP node, it first creates an abstract representation of the message using SOAP message elements and attributes. To send this abstract SOAP message over the wire to another SOAP node, the message may be serialized in a specified way so that the receiver can deserialize it. SOAP protocol binding describes how a SOAP message will be serialized and deserialized for sending over the wire using an underlying protocol.

Besides providing a concrete realization of a SOAP message for sending over the wire from one SOAP node to another, SOAP protocol binding provides a mechanism for supporting features that might be needed by an application. A feature specifies certain functionality provided by protocol binding. A feature can be referenced by the application using uniform resource identifier (URI).

In order to secure web service communication, multiple security technologies may be provided to secure Internet resources. One of the most widely used and proven security technologies is SSL (Secure Sockets Layer). Many online shopping sites use SSL to secure their resources. As many of the web services may use HTTP for communication, it may be possible to use SSL for securing web services. Unfortunately, in the Web services world however, SSL may have some limitations.

SSL/TLS may provide point-to-point security. SSL establishes a secure pipe between two adjacent communicating nodes and then transfers data using this pipe. While the data is in the pipe it is secured. However, once data came out of that pipe, it is in clear. That means the security context only exists between two adjacent nodes. Hence if a message needs to pass one or more hops before reaching the ultimate destination, the message may be in clear at some point of time in each of the hop. Therefore, if an attacker can get access in one of these hops, he can easily read or modify the message.

According to SOAP specification, a message can traverse one or more intermediaries before it is reached to its ultimate destination. Therefore, SSL is not suitable for securing this communication. To secure a web service the message is to be secured not the link. That means, the security context for a web service must exist end-to-end. End-to-end security is also called message level security as the security information for a message is embedded in the message itself.

WS-Security is a specification that specifies how message level security can be achieved. SSL is bound to HTTP. SOAP messages can be exchanged using a wide variety of protocols like FTP, SMTP, TCP, and HTTP etc. However, SSL can only be used to secure HTTP communication. Therefore, SSL is not suitable for securing web service communication.

SSL does not support partial visibility. Partial visibility means that part of a message will be encrypted and the rest will be in clear. SSL encrypts the whole message. However, partial visibility is a vital necessity in web service communication. According to SOAP specification, a sender can direct different parts of a message to different SOAP nodes. The discretion of the sender determines which part of the message will be encrypted, which part will be signed and which part will be in clear. SSL does not provide this provision, therefore it may not be suitable for web service communication security.

Due to the above mentioned limitations of traditional transport level security, there was a need for a different type of security mechanism for web service communication. Therefore, in April 2002 Microsoft, IBM and VeriSign proposed a security specification for web service communication. In April 2004, that standard was established as an approved OASIS open standard as further described in "Securing Web Services with WS-Security: Demystifying WS-Security, WS-Policy, SAML, XML Signature, and XML Encryption by Jothy Rosenberg, David Remy" for securing SOAP exchange. This it standard is known as WS-Security.

XML Digital Signature as described in "XML-Signature Syntax and Processing, W3C Recommendation 12 Feb. 2002" provides a mechanism for signing partial or chosen elements of an XML document. This signature can be used by the receiver of the message for verifying the integrity of the message and the authenticity of the sender.

A number of different types of resources can be signed using XML Digital Signature. For instance, character-encoded data like HTML, binary-encoded data like Image, XML-encoded data can be signed using a single XML Signature.

At the time of XML Signature validation, the data object that has been signed may need to be accessible. XML Signature indicates the location of the signed data object in one of the following ways:

The signed data object is referenced using a reference URI within the XML Signature element.

The signed data object is a child of the XML Signature element. That means the signed object is inside the XML Signature element.

The signed data object contains the XML Signature element, that contains its signature, within it. That is the signed data object is the parent of its Signature element.

The Signature generation process for XML Digital Signature may be broadly divided into two steps.

1. Reference Generation
2. Signature Generation
1. Reference Generation:

In this step, a reference element is created for each data object that has to be signed. First, a transformation is performed on the data object, then the digest value of the transformed data object is calculated and finally a reference element is created which references the data objects to be signed and may include the following elements:

i) Transformation elements to specify the applied transformation on the data object.

ii) Algorithm that is used to generate the digest value of the data object.

iii) The digest value of the data object.

2. Signature Generation:

In this step a <SignedInfo> element is created which includes the list of <ReferenceElement> (from the Reference Generation step), a <SignatureMethod> element and a <CanonicalizationMethod> element. The whole <SignedInfo> element is canonicalized using the method specified within the <CanonicalizationMethod> Element. After that a signature value is generated over this canonicalized <SignedInfo> element using the algorithm specified under the <SignatureMethod> element. Finally a <Signature> element is created which includes the <SignedInfo> element(s), a <KeyInfo> element and a <SignatureValue> element. The <KeyInfo> element represents the key used to generate the signature value, which is placed under the <Signature> element.

The signature validation procedure may be categorized in two operations:

1. Reference Validation
2. Signature Validation
1) Reference Validation:

In this step, the digest value for each referenced data object is checked for validity. First the <SignedInfo> element is canonicalized using the Canonicalization method specified under the <SignedInfo> element. Then, for each reference element the referenced data object is retrieved and a digest value is calculated on that data object using the digest method specified under the <Reference> Element. The resulting digest value is compared with the digest value specified under the <Reference> element. If these two values are same, then the verification proceeds for the second reference element. Otherwise, it generates an error message.

2) Signature Validation:

If the Reference Validation operation passed successfully, then follows the Signature Validation operation. In this step, the keying information, specified in the <KeyInfo> element of the <Signature> element, is retrieved possibly from an external source. Then, the Signature method is determined from the <SignatureMethod> element of the <SignedInfo> element. These two information, that is, Keying Information and Signature Method, are used to validate the Signature value specified under the <SignatureValue> element of the <Signature> element.

XML may represent information using a tree structure. XML Digital Signature allows non-contiguous objects of an XML dataset to be signed separately. The signed object may be referenced using an indirection (URI) by the reference element of the Signature. This indirect referencing does not give any information regarding the actual location of the signed object. Therefore, the signed object can easily be relocated and the Signature value will still remain valid. In cases where the location of the data object is important in the interpretation of the semantics associated with the data, this can be exploited by an adversary to gain unauthorized access to protected resources as further described in "An Advisor for Web Services Security Policies by Karthikeyan Bhargavan, Cedric Fournet, Andrew D. Gordon, Greg O'Shea at Microsoft Research". This is a limitation of XML Digital Signature.

WS-Security is an extension of the already described SOAP Messaging framework. WS-Security specification does not provide any new security protocol itself. Instead, it specifies how the prevalent security technologies can be used to secure SOAP messages. Authentication, integrity and confidentiality are three features of any secure communication protocol. WS-Security specifies a standard way of achieving these features for SOAP messages. It provides a mechanism for attaching security tokens with SOAP messages. Security tokens along with other mechanisms can be used to authenticate a client. WS-Security does not restrict applications to use a particular form of security token. However, a wide variety of security token formats including binary security tokens like X.509 certificate or Koreros Ticket can be attached with SOAP messages using WS-Security standard. WS-Security provides a mechanism for encoding binary security tokens for attaching to a SOAP message.

Integrity of a SOAP message is provided using XML Digital Signature technology along with the Security token. Security token represents the key using which a portion of the SOAP message is signed. This key is referenced from the signature. As the SOAP message has to go through a number of intermediaries before it is reached to the receiver, it is perfectly valid for the intermediary to produce its own signature. WS-Security provides a way to attach multiple signatures in the same SOAP message. This Signature provides a way for the receiver and/or the intermediaries to ensure that a SOAP message has not been tampered on its travel path. WS-Security may not specify any particular signature technology to be used for signing a SOAP message. Instead, a variety of signature technology can be used to sign different portions of the same SOAP message.

In the same way, confidentiality of a SOAP message may be provided using an XML Encryption mechanism in conjunction with Security token. The security token represents the key by which a portion of the SOAP message has been encrypted. The security token is referenced from the encryption element. As with XML Signature, WS-Security provides a way to encrypt different portions of a SOAP message to be encrypted by different SOAP actors (receiver/intermediary) and they can use different encryption technology to pursue this.

There are some limitations which have to be considered:

1) WS-Security uses XML Digital signature for signing non-contiguous parts of a SOAP message. Therefore, the limitations of XML Digital signature are also applicable to WS-Security.

2) WS-Security allows multiple security headers (with the same name) to exist in the same SOAP message. This may create a pit fall and can be exploited by an attacker. It will be shown later how this feature can be exploited.

3) WS-Security does not propose any new security technology. However, it specifies how the existing security technology can be used to secure a SOAP message exchange.

4) WS-Security encompasses many other standards like XML Digital Signature, XML Encryption, X.509 certificates Kerberos ticket etc ("Securing Web Services with WS-Security: Demystifying WS-Security, WS-Policy, SAML, XML Signature, and XML Encryption by Jothy Rosenberg, David Remy"). For this reason, the specification became quite complex.

WS-Policy is a generalized grammar for describing the capabilities, requirements, and characteristics of a Web service. WS-Policy is not specific to any particular domain like Security, Reliable Messaging, Privacy or Quality of service. It can be used to express the requirements of a web service for a broad range of domain. However, WS-Policy does not itself specify how the policy will be associated with a particular web service. For this association, a separate specification WS-Attachment has emerged.

Before using a Web Service, the client may need to know the requirements of that service. For instance, a particular Web service might require that all the requests coming to it must satisfy at least one of the following requirements:

i) Each request must contain either a User Name token or a X.509 token or both.

ii) User Name token if present must be signed by AES algorithm.

iii) X.509 token if present must be signed by Triple DES algorithm.

The following excerpt shows how service requirements can be expressed using WS-Policy:

```
<Wsp: Policy Id="Policy1" Name="MyPolicy">
   <Wsp:OneOrMore>
      <wsp:All wsp:Preference="100"/>
         <wsse:SecurityToken TokenType="wsse:UsernameToken" />
         <wsse:Algorithm Type="wsse:AlgSignature"
URI=" http://www.w3.org/2000/09/xmlenc#aes"/>
      </wsp:All>
      <wsp:All wsp:Preference="1"/>
         <wsse:SecurityToken TokenType="wsse:X509v3" />
         <wsse:Algorithm Type="wsse:AlgEncryption"
            URI="http://www.w3.org/2001/04/xmlenc#3des-cbc"/>
      </wsp:All>
   </wsp:OneOrMore>
</wsp:Policy>
```

The above shown excerpt represents a sample policy for a web service. A policy is actually a collection of policy assertions. A policy assertion asserts some requirements of a service that a client request must meet in order to use that service. The assertions are wrapped into a policy element. As it can be seen from the above shown excerpt, the policy element contains one policy operator <wsp:OneOrMore>. The policy operator can be used to create a quite complex policy, for instance a nested policy. In this example, only two policy operators are shown. There are other policy operators. The operator <wsp:OneOrMore> means that at least one of its child assertions must be applicable. This operator contains two <wsp:All> operators. This operator means that all of its assertions must be met by the request to be identified as valid. It is not mandatory to use a policy operator. All assertions can be directly specified as the child element of the root policy element. In this case, all of the child assertions must be met to get a service. In the excerpt above, each of the <wsp:All> operators contains two assertions within it. The first group of assertions specify that a request must contain a Username token and this token has to be signed by AES Signature algorithm. The second group of assertions specifies that a request must contain a X.509 token and it has to be encrypted using Triple DES Encryption algorithm. As these groups of assertions are embedded within an <wsp:OneOrMore> operator, this means at least one of those groups of assertions must be met to get a service protected by this policy file.

However, WS Policy standard may lack semantics. It provides a mechanism for describing the syntactic aspects of service properties. This introduces a limitation on the policy specification and policy intersection. For example, a provider may specify that its service supports a particular algorithm for the adjustment of data retransmission timeout value and a consumer may define a policy requiring a different algorithm. It might be possible to substitute the required algorithm by the provided algorithm, if they are compatible. However, the current standard does not support this kind of relationship identification. Thus, although it is possible, the interaction between the provider and the consumer may not occur as further described in "Semantics-enriched QoS Policies for Web Service interactions by Diego Zuquim Guimarães Garcia and Maria Beatriz Felgar de Toledo".

As mentioned before, WS-Policy provides a general framework for representing web service's constraints and requirements. However, it does not specify any security assertion for any particular problem domain like reliable messaging or security. Each domain has its own specific assertion profile. WS-Security Policy as described in "Web Services Security Policy Language (WS-Security Policy)" specifies policy assertions to represent the security requirements of a web service.

WS-Security policy specifies a number of security assertions like Security Token assertion, Integrity assertion, Confidentiality assertion, Visibility assertion, Message Age assertion and a lot more.

Security Token Assertion: Security Token Assertion specifies what sort of security token is required and accepted by a web service or Web service client. This assertion is applicable to both the request and the response messages. As outlined in "Securing Web Services with WS-Security: Demystifying WS-Security, WS-Policy, SAML, XML Signature, and XML Encryption by Jothy Rosenberg, David Remy", Security token assertion can be of much type like UserName Token assertion, X.509 Token assertion etc.

Integrity Assertion: Integrity Assertion specifies whether a SOAP message needs to be signed or not. It also specifies which parts of a SOAP message is to be signed and also which algorithm should be used to sign it. This assertion is applicable to both the request and the response SOAP messages.

Confidentiality Assertion: This assertion can be used by a Web service or its client to specify that parts of a request or a response SOAP message must be encrypted. This assertion can also specify how the encryption should be done, that means which encryption algorithm should be used for the encryption.

Visibility Assertion: The Visibility assertion allows an intermediary to require that a certain portion of the SOAP message be visible to it. Visible means either in the clear or encrypted in a way that the intermediary is able to decrypt limitation as described in "Securing Web Services with WS-Security: Demystifying WS-Security, WS-Policy, SAML, XML Signature, and XML Encryption by Jothy Rosenberg, David Remy".

Message Age Assertion: The Message Age assertion is used to specify the time period, after which a message will be considered stale.

However, securing a web service using WS-Security Policy is no panacea. It is essentially a domain specific language, which selects cryptographic communications protocols and uses low-level mechanisms that build and check individual security headers. It gives freedom to invent new cryptographic protocols, which may be hard to get right, in whatever guise.

The specifications for web service security are evolving day by day with an immense speed. Although these specifications may not offer any new security protocol, they provide a framework that integrates existing security protocols to secure web service communication. Therefore, it may be necessary to identify whether these web service security specifications have achieved their security goals or not. This can be done by simulating different attack scenarios and verifying whether a security framework can guard against this attack. However, most of the time this brute force approach cannot reason about the security characteristics of a particular security framework. Because, the absence of a security flaw in a particular attack scenario does not specify that the security framework is not vulnerable in any other attack scenario. This type of reasoning regarding the security characteristics of a security framework can be achieved using formal methods. Therefore, formal methods are now applied to verify the security goals of web service security specifications. One of the earliest project that applied formal methods to verify the security goals of a web service security specification is Microsoft's SAMOA project.

All of those formalizations indeed may make some assumptions. One of the assumptions, which is indeed a limitation of these formalizations, is that a message can be read, written or modified by an attacker if the attacker knows the right key. Otherwise the attacker cannot perform the attack. However, it can be shown that this is not true for all sorts of attack. Moreover, a limitation of the above formalizations is that they may not model insider attacks.

A Web service may be a programmatic access to web sites. Therefore, it is vulnerable to the same kind of attack applicable to traditional web sites such as, DOS (Denial of Service), SQL Injection attack, etc. Moreover, as a web service uses XML data for exchanging messages, it may be vulnerable to another class of attack known as an XML rewriting attack, which occurs due to the structural weakness of XML data. An XML rewriting attack is a common name for a range of attacks such as, for example, replay, man-in-the-middle, redirection, and dictionary attack. The attacker exploits the flexibility of the SOAP security extensibility to capture, manipulate and replay SOAP messages without violating the integrity of the SOAP message. In the following, some attack scenarios in the context of a web service message exchange will be presented to better understand an XML rewriting attack.

A simple SOAP-based server that responds to requests for the latest prices of a list of airline tickets is considered. The server charges a subscriber's account for each request and does not wish to respond to non-subscribers. Therefore, it may require that a message signature generated using an X.509 certificate belonging to one of its subscribers authenticate each request. Moreover, it may require that each request includes a unique message identifier to be cached to detect a message replay.

Suppose a client wants to see the list of airline tickets. As the client is charged for each request it makes, the request contains a message ID, which is used by the server to keep track of client requests. Furthermore, the message ID of the request along with some other parts of the message are signed by the client using a X.509 certificate belonging to the client, which will help a corresponding server to authenticate the client and to check for the message integrity.

FIG. 1.1 shows the SOAP message that is sent by the client to the server. An attacker, sitting in between the client and the server intercepts the message. He then puts the <MessageID> header into another header <Irrelevant> and creates its own <MessageID> header with a new value. He then sends the message to the server.

FIG. 1.2 shows the message the attacker may send to the server after interception and modification.

The server on the other side, after receiving the message will try to validate the integrity of the message. It can be seen from FIG. 1.2, although the attacker has tampered on the message, he did it in a way so that the integrity of the message remains valid.

The scenario shown in FIG. 2.1 depicts how an XML rewriting attack can be used to redirect a SOAP request. Suppose a client wants to see the list of airline tickets. WS Addressing specifies a way for embedding the URI of the ultimate receiver through the use of a <To > element. FIG. 2.1 shows a request that the client sends to the airline ticket server with the URI of the server embedded into the request under the <To > element. The X.509 certificate of the client signs this <To > element. The request also uses a <From> element, specified in WS-Addressing to indicate the sender of the request. However, this element is not signed.

FIG. 2.2 shows the request modified and relayed by the attacker. The attacker simply puts the signed <To > element under an <Attack> element and introduced his own <To > element with a different URI. As it was seen in the previous example, with this modification of the attacker the integrity of the message will remain unchanged but the application logic will consider the <To > element introduced by the attacker instead of the <To > element that went into the <Attack> element and the message will be redirected to a different location instead of the location it was sent for.

According to WS-Security specification, a SOAP message can include more than one Security header. However, according to this specification no two Security headers can have the same role attribute value. As we saw before, the client includes a signed <MessageID> in the request message to help the server to keep track of the client request. The server caches the <MessageID> value. Whenever the server receives a request from the client, it tries to find the <MessageID> value in the cache. If it finds one, then it infers that someone, other than the intended client, has replayed the message and it will generate a SOAP fault. However, it is obvious that the cache has a limited capacity. The server has to delete cache entries after a certain amount of time. WS-Security also specifies a <Timestamp> header to indicate the server the time limit after which the server can delete the cache entries associated with the current request. FIG. 3 shows a client request with a signed <Timestamp> header.

FIGS. 3.1 and 3.2 depict how an attacker can exploit the flexibility of WS Security specification. When the client sends the message to the server, the attacker intercepts the message and waits until the <TimeStamp> value is expired. Then he creates a new Security header with role attribute's value "None" and "mustUnderstand" attribute's value "False". Then he cuts the <TimeStamp> element from the original security header and puts it in the newly created security header. He then creates his own <Timestamp> header element and puts it under the original security header. Then he sends this message to the server. The SOAP processor on the server side will try to process the message and will ignore the Security header created by the adversary silently. Signature validation will also pass successfully as the Signature element references the <Timestamp> header element using XPointer, which does not take care of the location of the referenced element. Therefore, even though the attacker moved the <Timestamp> header element under a different <Security> header element it will resolve it as if it was not moved. Consequently, the SOAP processor will take the <Timestamp> element created by the attacker into account. As the server has deleted the cache of the client request due to the Timestamp expiration, it will not be able to find the <MessageID> of the attacker's message in its cache and will consider the request as a fresh request from the client. Therefore, the server will process the request as if it was sent from the intended client.

The attack scenarios presented in the last section do not cover all of the vulnerabilities that can arise in web service communication. Although simple at a first glance, an XML rewriting attack is not something that may be easily detected and removed. In the following, it is described some works done previously in order to get rid of this sort of attack.

If used correctly, WS-Security policy can act as a countermeasure against an XML rewriting attack. As explained before, web service operations are published using a WSDL file. This file contains the name of the operations the server offers and the input and output parameters required and produced by those operations. Security policy can be associated with these operations and/or with the input and output messages. These policies specify the security requirements of a web service. However, it is quite difficult to specify all possible security requirements in a WS-Security policy file. In "XML Signature Element Wrapping Attacks and Countermeasures by Michael McIntosh, Paula Austel from IBM research" the authors have shown different sort of rewriting attacks and the associated policy files for the detection of these attacks. They have also shown how an attacker can take advantages of a security policy hole in order to get unauthorized access to system resources. According to "XML Signature Element Wrapping Attacks and Countermeasures by Michael McIntosh, Paula Austel from IBM research" in practice the semantics of XML elements depends on its location. However, XML Signature provides for the referencing of an element independent of its location. They further showed that the flexibility that a SOAP header provides can be exploited by an attacker in a naïve way. The example shown in FIG. 4 is taken from "XML Signature Element Wrapping Attacks and Countermeasures by Michael McIntosh, Paula Austel from IBM research".

FIG. 4.1 shows a client request to a stock quote application. This application takes a client request and returns the quote for the symbol specified as <getQuote@Symbol>. The request also includes a <ReplyTo> header element, which is specified in WS-Addressing. This element specifies where the response should be sent. Moreover, this <ReplyTo> element is optional. If it is not specified in the request, the response will be sent to the location from where the request has come.

FIG. 4.2 shows a sample security policy requirement of the stock quote application. It says that the request must contain a body element. This body element has to be referenced from the signature element that means the body element must be signed. The request may contain a <ReplyTo> element and if it contains a <ReplyTo> element then this <ReplyTo> element must be signed. Finally, it says that the signature must be verified using a X.509 certificate generated by a Certificate Authority (CA).

At first sight, it might seem that the security policy in FIG. 4.2 is sufficient for the stock quote application. But it may not be sufficient. FIG. 4.3 shows how an attacker can bypass the security requirements specified in FIG. 4.2 to redirect the response. As stated before, the <ReplyTo> header element is optional. Therefore, the attacker can intercept the client request shown in FIG. 4.1 and wrap up the <ReplyTo> header element by a <wrapper> element. This modification does not violate the security requirements of the application. The modified message of FIG. 4.3 contains a <Body> element, which is signed. It does not contain any <ReplyTo> element as it is now wrapped under a <wrapper> element and according to SOAP specification if a SOAP processor does not understand a header element it will ignore it silently. Therefore, when the stock quote application will receive the request of FIG. 4.3 it will discard the <wrapper> element. Moreover, a X.509 certificate generated by a CA can verify the signature. As all the security requirements are fulfilled, the application will process the message as if it was not tampered by an attacker and will send the response from where it got the request, in the above case to the attacker.

A deep investigation of the above scenario reveals the following reasons for this sort of vulnerabilities:

1) The SOAP Extensibility model and its processing rule allows optional header elements to be added to the header of a SOAP message. This feature provides for a better interoperability. Applications can use their own header element without any negotiation. On the other hand, this flexibility can be exploited by an attacker.

2) The reference from the signature element is using XPointer to reference the signed element, which does not take care of the location of the signed element.

In "XML Signature Element Wrapping Attacks and Countermeasures by Michael McIntosh, Paula Austel from IBM research", they have proposed the use of Xpath expression for the removal of such an attack. This Xpath uses an absolute path of an element to reference it. FIGS. 4.4 and 4.5 show the request presented in FIG. 4.1 using Xpath for the reference and the new security requirements.

FIG. 4.6 shows a sample SOAP message that includes a Security header. This Security header among other information contains a signed Timestamp element. FIG. 4.7 shows a WS Security policy for the application server. In this policy, it is specified that the Timestamp element is optional. However, if it is present, then it must be signed. Moreover, it also specifies that the Timestamp element if present must be located under/soap:Envelope/soap:Header/wsse:Security. Now, if an attacker wraps up the Timestamp element under another fake element, the policy of the application server may easily detect it. Nevertheless, it still may be possible for an attacker to fool these policies. FIG. 4.8 shows how this can be accomplished.

In FIG. 4.8, the attacker created a new Security header, which conforms to the WS Security specification. However, according to WS Security specification, although a SOAP message, may contain multiple security headers, no two security header can have the same role attribute value. Therefore, the new Security header created by the attacker has a role attribute's value "none". It means no SOAP node should process this header. Then the attacker cuts and pastes the Timestamp element from the existing Security header to the newly created Security header. After that, he/she created a new Timestamp element under the existing Security header.

When the SOAP processor on the receiver side will receive the SOAP message, it does not have any reason to make any complaint as the request fully conforms to the security policy. The Signature validator as well will find everything valid as the Xpath expression "/soap:Envelope/soap:Header/wsse:Security/wsu:Timestamp" will resolve to a set that will contain the signed Timestamp element. In "XML Signature Element Wrapping Attacks and Countermeasures by Michael McIntosh, Paula Austel from IBM research", they have proposed to include not only the name of the parent element in the Xpath expression, but also some attribute values that will uniquely identify the parent of the signed element. For instance, instead of the path expression specified above, they proposed to use the following expression: "/soap:Envelope/soap:Header/wsse: Security[@soap:role=" . . . /ultimateReceiver"]/wsu:Ti mestamp".

However, the above solution may not be enough to detect all rewriting attack that takes place using the above weakness of XML Digital Signature. Besides, they have mentioned two other sorts of context problems namely, a so-called Simple ancestry context problem and a so-called Sibling value context problem. The former type of problem occurs when the attacker changes the parent of a signed element. This problem may be detectable with Xpath referencing and WS Security policy. The sibling value context problem occurs if the application logic is dependent on the order of the signed elements. Then, the attacker can simply change the order of signed elements and this tampering will not get detected, as Xpath does not provide any information for the sibling of a signed element.

Microsoft's WSE or Web Service Enhancement is an implementation of many WS-specifications. It provides a library to create and process SOAP messages and headers. Many of the web services and their clients may be written and compiled using a strongly typed language. In "An Advisor for Web Services Security Policies by Karthikeyan Bhargavan, Cedric Fournet, Andrew D. Gordon, Greg O'Shea at Microsoft Research", it is described that for the ease of parameter adjustment after the deployment of a web service, configuration files are used. These configuration files are loaded by the web service and their clients for the enforcement of the newly created or changed parameters without the recompilation of their code. In the case of WSE, WS-Security policy is part of this configuration file. It has already been shown that WS-Security policies may be vulnerable to an XML rewriting attack if not written correctly.

WSE Policy Advisor is a rule-based tool for detecting typical errors in WSE configuration and policy files. It takes the policy and configuration files of WSE, runs some static queries on them and generates security reports and remedial actions for security flaws. This tool has more than 30 queries. These queries check for some syntactic conditions of those policy files.

These syntactic conditions are determined by security reviews of the policy and configuration files of WSE. If these security conditions are not met by the policy files, the tool generates a report stating the threat that might occur due to this missing syntactic conditions. It also generates a remedial action that can be used by the author of the policy files to fix the flaw.

Although WSE Policy Advisor can detect errors that otherwise might be overlooked, it may have the following drawbacks:

i) WSE Policy Advisor does not provide any formal guarantees. It only provides a suggestion regarding possible flaws in policy configuration files found by running some queries.

ii) WSE Policy Advisor shows very poor performance if the policy configuration file becomes complex.

iii) The queries that are run by WSE-Policy Advisor may not detect possible existence of a signed element reordering attack.

In "Towards Secure SOAP Message Exchange in a SOA by Mohammad Ashiqur Rahman" and "An Inline Approach for Secure SOAP Requests and Early Validation by Mohammad Ashiqur Rahman" the author has proposed an approach for the detection of an XML rewriting attack. They have introduced a new header element called SOAP Account. This header element will keep different information of a SOAP message. The SOAP Account may include the following information of the SOAP message:

i) How many elements does the envelope of the SOAP message contain ii) How many header elements are there in the header of the SOAP message iii) How many signed elements are their in the SOAP message iv) The immediate parent of each signed element v) The successor of each signed element vi) The siblings of each signed element In conjunction with these elements, they have kept a field for future extensions in the SOAP account. They have created a module that before sending the SOAP message calculates the information necessary for the SOAP account and appends a SOAP account header element in the header or in the body of the SOAP message. As the SOAP message can pass through one or more intermediaries on its way to the ultimate receiver, the intermediaries are allowed to append its own SOAP account after the processing of the SOAP message. The author has imposed a restriction that the SOAP account must be signed by the creator using its X.509 certificate or by some other method. Each successive SOAP node must sign its own SOAP account concatenated with the signature of the previous node.

FIGS. 5.1 and 5.2 demonstrate how this SOAP account can be used to detect an XML rewriting attack on the SOAP message of FIG. 1.1. Whenever an attacker relocates the MessageID element of the SOAP message into an attack element, the structural information of the changed SOAP message does not match the information present in the SOAP account header element. Moreover, it may be required that the SOAP account must be signed. Therefore, the attacker cannot modify this SOAP account. Nevertheless, there is a possibility that the attacker can delete the SOAP account completely. To prevent this possibility the WS-Security policy can be used. This policy will check for the presence of a SOAP account header element. If it does not find one, it will generate error. That means, on the receiver side, a security policy must be present, which will check for the following:

i) SOAP account element is present under either the body element or the header element of the SOAP message.

ii) SOAP account element is signed which can be verified by a certificate issued by a trusted authority.

The approach presented here may detect a wide range of XML rewriting attacks. However, it may not detect all types of rewriting attacks that can take place. An analysis on this SOAP account approach can be summarized by the following points.

i) It does not include any mechanism to detect a replay attack. Although use of MessageID or Timestamp is proposed, it has to be considered the fact that these elements are optional. It is perfectly valid for a SOAP message to not include a MessageID or Timestamp. In that case, even though the SOAP message contains a SOAP account element, it is prone to an XML rewriting attack.

ii) The approach does not include any mechanism that can uniquely identify the parent of a signed element. Therefore, an attacker to gain unauthorized access to protected resources can use this unawareness of a SOAP account.

iii) The SOAP account itself is prone to an XML rewriting attack. It is specified that the receiver should check for the presence of the SOAP account element after receiving the SOAP message. However, as said before, the intermediaries can append its own SOAP account element in the SOAP message. Therefore, the number of SOAP account elements in a SOAP message is not fixed. For this reason, it is not possible to specify in security policy, how many SOAP account elements must be present in a SOAP message. The attacker can exploit this problem. He can just cut one of the several SOAP account elements of the SOAP message and paste it into a header element that is not signed and make the role attribute of the header element "None" and "mustUnderstand" attribute to false. Then, this header element will not be processed by the ultimate receiver or by any of the intermediaries. However, during the signature validation the reference of the relocated SOAP account element will be found as it is not removed but relocated.

iv) In a SOAP account element one of the fields is used to keep track of the siblings of a signed element. However, according to SOAP specification, an intermediary can append its own element in any place of a SOAP message. Therefore, this sibling information might change from node to node. It is not specified how this change can be detected by the ultimate receiver at the time of validation of the message.

v) In a SOAP account element, there is a field that keeps track of the successor of a signed element. However, this information does not have any role in the process of validation of a SOAP message. XML digital signature actually signs the digest value of an XML element. The digest value is calculated on the sub-tree rooted at the element that is to be signed. Therefore, if an element is signed all of its children are signed implicitly.

FIGS. 5.3 and 5.4 show how the SOAP account approach can become vulnerable to an XML rewriting attack. FIG. 5.3 shows a request SOAP message. This request contains the following:

i) A Timestamp element under the Security header. This element is signed.

ii) An Option element which is an Optional header element specific to some application.

iii) A Body element which is signed.

iv) A SOAP Account header element. This header element contains information regarding the SOAP message. Moreover, this header element is signed.

FIG. 5.4 shows how an attacker can modify the SOAP message and still keep the SOAP account information unchanged. He may do it in the following way:

i) He creates a role attribute for the Option header element and sets its value as "None". He also creates a "mustUnderstand" attribute for the same header element and sets its value to "false".

ii) Under this Option header element he creates a Security Element. He cuts and pastes the Timestamp element from the original Security header element to the newly created Security element.

iii) He then creates a BinarySecurityToken and a Signature element under the newly created Security header.

iv) He creates his own Timestamp element under the original Security header element.

When the above SOAP message will be received by the service provider, the SOAP Account validation module will try to verify the message. It will not be able to detect any tampering as none of the information that it contains has been changed. So, it will pass the message to the next step for Signature validation. This step will also pass successfully as the signed Timestamp element has not been removed instead it has been relocated. The SOAP processor will not process the Option header element as it has a role attribute value of "None" and the processor is not obliged to understand this header element as this element has a "mustUnderstand" attribute value of "false". Therefore, the request will be processed normally and the attacker's target will be fulfilled.

It can be noted here that the above attack is not the only one that can be done to jeopardize the SOAP account security. As said before, the SOAP account itself is vulnerable to an XML rewriting attack. How it happens may be understood from FIGS. 5.3 and 5.4. However, it should be noted that the SOAP account itself could be vulnerable to an XML rewriting attack whenever a SOAP message contains multiple SOAP account header elements.

In the previous sections, different solutions proposed for the detection of an XML rewriting attack were presented. It was briefly explained how they work. However, it may be that the solutions may not properly remove an XML rewriting attack. While they are handling one sort of XML rewriting attack properly at the same time they may fail to take care of some other type of XML rewriting attack. The first solution, using Xpath expression with WS Security policy, can remove some XML rewriting attacks, but it may fail when there are multiple header elements with the same name under the header of the SOAP message. It also could not remove the sibling value-reordering problem, when the order of the signed elements is changed to perform an attack. The second solution, WS Policy Advisor, may be efficient in dealing with an XML rewriting attack. However, it also has shortcomings. The third solution, namely the SOAP account approach, may be able with a wide range of XML rewriting attacks, but it is also may be vulnerable in some cases.

SUMMARY

An approach for the detection and removal of an XML rewriting attack is proposed in the following. The proposed approach can detect XML rewriting attacks in cases where other approaches discussed above may fail to do so.

The proposed approach may be used for all kind of messages which are similarly structured as SOAP messages. In the following, principles of SOAP technologies will be taken as an exemplary application of the proposed approach.

Each SOAP message header element may contain a role attribute according to the SOAP specification. There are three roles defined in SOAP specification, "UltimateReceiver", "Next" and "None". Each SOAP node within a network system, which processes a SOAP message, may assume a role while processing the SOAP message. Beside these three roles, each application can define its application specific roles. However, in discussing the proposed method, the roles specified in SOAP are considered in detail but the proposed method is not to be understood as being limited to those cases.

According to one general aspect, a method is provided for protecting a message from an XML attack when being exchanged in a distributed and decentralized network system between an initial sender and an ultimate receiver. The message may comprise a plurality of message elements including a number of signed message elements and may be represented in a tree structure with an envelope as its root with at least two children, a body and a header, the header having at least a first attack preventing header block as at least one immediate child, wherein message elements may be represented by a name and a unique ID attribute, respectively, and the initial sender sends the message together with structure specific information of the message to the ultimate receiver, wherein the information is carried by the first attack preventing header block and may comprise at least a digest value of a pre-order traversal list of the message tree and for each signed message element targeted to the ultimate receiver the name and ID attribute, a depth and a parent's name and the parent's ID attribute, so that the ultimate receiver when receiving the message can identify any XML rewriting attack against any one of the signed message elements by comparing the structure specific information which can be derived from the received message with the information carried by the attack preventing header block.

Within the scope of the present disclosure, a SOAP message, as already indicated, is representative for SOAP messages and all kind of messages which are similarly structured.

In an XML rewriting attack, it is implicitly assumed that the attacker does not have the capability of signing a message element. Therefore, the attacker cannot edit, create or delete a signed message element. However, the attacker may modify the message in a way that does not violate the underlying signature. The types of modifications that can be done by the attacker to perform a rewriting attack on a SOAP message, for example, can be summarized in the following points:

i) Wrapping a message element into another new fake element. Here, the attacker creates a new fake element taking the flexibility of the SOAP extensibility model, which allows for any header elements to be added in the SOAP header. Then, the attacker cuts a signed message element and pastes it under this newly created fake element.

ii) Moving a message element under another existing header element. Here, the attacker takes the benefit of SOAP extensibility model, which specifies that multiple header elements might have the same name.

iii) Reorder the signed message elements among them. As no information is available regarding the relative position of a SOAP message element, the attacker may easily do this. This change might create problem for an application that depends on the order of the signed message elements.

iv) The attacker can copy a message, particularly a SOAP message and then relay it later. This may be referred to as a replay attack.

v) The attacker can create his/her own header element under the SOAP header. If the application does not have proper security protection, this can give him/her unauthorized access to system resources.

Within the scope of the present disclosure, the tree representation of a message may have an envelope as its root. The root may have one or two children, namely, a body and a header. With respect to the tree structure, the term "depth" may be defined herein as follows: the depth of a message element in a tree is the length of the path from the root of the tree to the message element.

If an attacker wraps up a signed message element using a fake element, then the depth of the signed element may be changed. Therefore, this sort of attack may be detected by just keeping track of the depth information of the signed message elements. However, not every attack changes the depth of a message element. A message element may be relocated without changing its depth. As discussed above, a SOAP message for example may have multiple header elements with the same name. An example of this sort of header element is the security header, which is specified in WS-Security as further described in "Web Services Security: SOAP Message Security 1.0 (WS-Security 2004) OASIS Standard 200401, March 2004". However, WS-Security may impose a restriction regarding the role of security header elements. According to this specification, no two security header elements can have the same value for their role attribute. The default role attribute's value for a header element is "UltimateReceiver". Moreover, one can explicitly specify the role attribute value for a header element as "UltimateReceiver". Therefore, there can be two security header elements targeted for the ultimate receiver. Beside this security header, an application can define its own header element and allow multiple instances of this header element to exist in one SOAP message. Now, if an attacker cuts an element of one of those instances of this one header element and pastes it under another instance of this header element, the depth of this element will still remain unchanged. Thus, such a modification can break the protection of the receiver.

One solution to detect this sort of modification could be keeping information regarding the parent of a signed message element. But, there may be multiple header elements with the same name. XML Digital Signature makes an indirect reference to a message element that is to be signed. For this indirect reference to work properly, it has to be able to uniquely identify an element. Otherwise, it would sign the wrong message element, which may not be desirable. For this unique referencing, XML Digital Signature makes use of the Id attribute of a message element. WS-Security defines an Id attribute for uniquely identifying a message element. This Id attribute is used as follows:

<anyElement wsu:Id=" ... "> ... </anyElement>
wsu:Id is of type xsd:ID. WS-Security also specifies that two elements within a document may not have the same wsu:Id value. Therefore, this attribute may be used for uniquely referencing the parent of a signed message element.

However, also keeping track of the depth and the parent Id of a signed message element, may not solve the problem to detect this kind of modification. Because, the parent may have its own parent, that parent may have its own parent and so on. Moreover, as the parent is not signed, the attacker may also change its Id. That means that a signed message element may not be relocated without changing its depth and parent Id.

The Ids of the siblings of the signed message elements also may not restrain the attacker from relocating the signed message element as the attacker can also manipulate the siblings Ids if they are not signed. It should be noted here that the attacker could also create a new message element with a unique Id or delete an unsigned message element from the SOAP message.

In order to solve the mentioned problem as a whole, it is thus proposed to proceed as follows: First of all, every element of a SOAP message may be given a unique Id. For the first instance, it is assumed that there are only two SOAP nodes, the initial sender and the ultimate receiver. Any possible intermediaries may be introduced and discussed later. As described, an attacker can create or delete message elements from a SOAP message. In order to restrain the attacker from doing so, it is proposed to use a digest value in this regard. Here, hashing may be used.

A so-called hash also may be referred to as a message digest. It may be a one-way function that takes as input a variable length message and generates a fixed length hash value. A hash function may be one-way as it is possible to generate output y for input x with this function; however, it may not be practically possible to get back input x from output y.

The hash of a message m will be denoted in the following as $h(m)$. Then $h(m)$ should contain the following properties:

i) $h(m)$ may be computed for any given message m. That means it should not consume a lot of processing time to compute the hash $h(m)$ for any message m.

ii) Given $h(m)$, there may be way to find a m that hashes to $h(m)$ in a way that is substantially easier than going through all possible values of m and computing $h(m)$ for each one. This is further described in "Network Security: Private communication in a public word. By Charlie Kaufman, Radia Perlman, Mike Spencier".

iii) From the definition of hash, more than one message m may map to the same hash value $h(m)$. However, it may be computationally infeasible to find two messages that map to the same hash value.

There may be a number of hashing algorithms that may be used such as, for example, SHA-1, SHA-224, SHA-256, SHA-512, etc. These hashing algorithms are called secure hash algorithm. The numbers associated with the name of the hash algorithms indicate the length of the output in bits. For instance SHA-256 means, this algorithm may take a variable length message as input and will produce a 256 bits message digest.

It may be possible to form a string that is created by concatenating the Ids of a SOAP message. This string is called S1. A digest method D( ) is considered that takes the string S1 and generates a digest value MD=D(S1) for that string. If now an Id is concatenated to the string S1 or an Id is deleted from string S1, the digest value may be changed. Lets assume that S1 is defined by S1=EHB12345678, wherein E, H, B, 1, 2, 3, 4, 5, 6, 7, and 8 are the respective Ids of the message elements. Under the assumption that a further ID is concatenated to the string S1 so that the resulting string is S2="EHB123456789", the digest value for the string S2 could be defined as MD'=D (S2). According to the properties of the digest method MD'≠MD. Therefore, this digest method may be used for restraining the attacker from adding or deleting message elements in a SOAP message. The sender of the SOAP message may have to ensure that each message element has a unique Id. However, Id may be an optional attribute. Therefore, it is proposed to ensure by means of a module that each message element gets an Id. After that a digest value may be calculated on the string of Ids of the SOAP message and this digest value may be sent to the ultimate receiver along with the SOAP message. The ultimate receiver may check that each message element has a unique Id and then may create a digest value on the string of Ids present in the received SOAP message. This digest value may be compared with the digest value sent by the sender. If it does not match, then the receiver may infer that an attacker has added or deleted some message elements to or from the message. So, using message digest any addition or deletion of message elements in a SOAP message may be detected. It is proposed that the message digest method takes as input a string, which is created by concatenating all the Ids of a SOAP message. Since it may be difficult for the receiver without any further input to determine in which order it should concatenate the Ids to create the string, one solution for this is that the sender gives the receiver a hint regarding the ordering it has used to create the string of Ids along with the digest value. Another solution could be both the sender and the receiver know a priori what ordering to use. The later solution can be that both the sender and the receiver may use the so-called pre-order traversal technique of a message tree for this ordering. In a pre-order traversal of a tree, the root is traversed first, then the children of the root are traversed from left to right order. This can be defined recursively as follows:

$$\text{Traverse}(t) = \begin{cases} 0 & \text{if } t \text{ is an empty tree} \\ (r(t_1, t_2, t_3, \ldots t_n)) & \text{if } t \text{ is a tree with root } r \\ & \text{and the children of } r \text{ are} \\ & t_1, t_2, \ldots t_n \text{ in left} \\ & \text{to right order} \end{cases}$$

The original message tree may be built up if given this sort of traversal list.

So, the message element addition and deletion attack has been removed by using the message digest technique. In case of modification of a message, as the traversal list is unique for a message tree, if the attacker just cuts and pastes message elements from its original position to another, the traversal list may be changed which would result in the change of the respective digest value. Moreover, the attacker may not change the depth of an element.

For instance, let an absolute path of message element m from the root is

AbsolutePath (m)=r, x, y, z, m

The depth of message element m is assumed to be 4. Now, if the depth of element m is to be changed, a new tree node may be introduced or some existing tree node may be removed from the absolute path of m. However, if this modification is done, it may change the traversal list of the message tree, which may result in the change of the digest value.

However, an attacker may change the name of message elements. In this case, the traversal list may not change and consequently the digest value also may not change. As a countermeasure of this modification problem, it is proposed not to take only the Id of a message element but also the name of that message element while creating the traversal list. The name of a message element can be combined with its Id for example in the following way:

Element Identifier=ElementName:ElementId

Now the attacker may only change the Id and name of unsigned message elements but cannot change the Id or name of signed message elements. Therefore, this digest method may not allow the attacker to relocate or modify any signed message element of a SOAP message. According to the proposed method, the signed message elements are protected against an XML rewriting attack.

To protect signed message elements of a message, particularly of a SOAP message against an XML rewriting attack, the following pieces of information may be used:

i) The name of a message element
ii) The Id of the signed message element
iii) The depth of the signed message element
iv) The parent's name and the parent's Id of the signed message element
v) The digest value of the pre-order traversal list of the message tree, particularly the SOAP message tree.

The above information, except the first one, may be sent from the sender to the ultimate receiver in a header block, which may be carried in a first attack preventing header block which is denoted in the following also as a RewritingHealer. The structure of this header block will be further described in connection with the drawings. Here it should be further taken into account that this header block could itself become the subject of an XML rewriting attack. To preclude this attack, the following restriction regarding the location and the signature of the header block is proposed:

i) The RewritingHealer may be signed. Additionally, XPath expression may be used to reference the RewritingHealer from the signature element.

ii) The RewritingHealer may exist as an immediate child of the header of the SOAP message.

iii) Every message should contain this RewritingHealer. Even if a message does not have any signed message element, it should contain the RewritingHealer with no information regarding signed message elements.

If the above conditions are enforced correctly, an attacker may not be able to relocate or modify the RewritingHealer.

In another general aspect, a method for protecting a message including a plurality of message elements from an XML rewriting attack when being exchanged in a distributed and decentralized network system is provided, wherein in case the message traverses when being exchanged between the initial sender and the ultimate receiver at least one intermediary for which the message contains signed message elements, the message comprises at least a second attack preventing header block carrying structure specific information regarding the signed message elements targeted to the at least one intermediary.

In still a further aspect, it is provided in case the message traverses when being exchanged between the initial sender and the ultimate receiver a plurality of intermediaries for each of which the message contains signed message elements, respectively, the message may comprise a corresponding plurality of attack preventing header blocks, each carrying respective structure specific information regarding the signed message elements targeted to one of the intermediaries, respectively.

So far only two nodes have been considered, namely the sender and the ultimate receiver. However, particularly in case of a SOAP message according to SOAP specification, a SOAP message can traverse zero or more intermediaries before reaching the ultimate receiver. So, the existence of the intermediaries has to be considered in this point.

As explained before, each SOAP node may assume a role while processing a SOAP message. There are SOAP defined roles and also application defined roles. The role of a SOAP node may determine which header blocks it should process. Header blocks contain a role attribute that may be used to target it for a SOAP node. This role attribute can assume one of three possible values. These values are "Next", "UltimateReceiver" and "None". When a SOAP node finds that the role attribute's value of a header block matches the role it has assumed, it might process the block. The ultimate receiver of the message can assume the roles "UltimateReceiver" and "Next". The intermediaries can assume the role "Next". If the role attribute's value of a header block is "None", it means that any SOAP node on its path should not process this header block. In other words, no SOAP node can assume the role "None". The default role attribute's value for a header block is "UltimateReceiver". That is, if a header block does not contain any role attribute's value, its role attribute's value may be considered as "UltimateReceiver". It is assumed that all the children of a header block may inherit the role of its parent.

A SOAP intermediary may process the header blocks targeted for it. It may not remove or reorder any header blocks that is not targeted to it. The intermediaries may remove header blocks with role attribute's value "Next". Moreover, it can append its own header blocks. But this modification does not change the relative order of the header blocks targeted to the ultimate receiver. The body of a SOAP message may be targeted to the ultimate receiver.

Therefore, it is proposed according to a further aspect that each message element of a SOAP message is assigned a role attribute indicating its target server/node within the network system.

As already mentioned, the role attribute is one of the group consisting of "None", "intermediary" denoted as "Next", and "ultimate receiver", denoted as "UltimateReceiver".

According to a further aspect, it is proposed to represent a message using a tree structure of the message and label each node of the tree with the role attribute of the corresponding message element. As mentioned before, a message element may inherit the role of its parent. Thus, a first, a second and a third tree corresponding to the respective role attributes can be extracted from the tree structure of the message.

It should be noted that the envelope and the header of a message, particularly of a SOAP message may not have any role therefore they can be represented using their Id E and H, respectively.

It is possible for example to delete the nodes from the tree except the nodes with the label indicating "intermediary" and the nodes with label E and H. Thus, a tree is obtained which represents the message elements of a message, for example, of a SOAP message that are targeted to an intermediary. In the same manner, if the nodes except those nodes with a label indicating "ultimate receiver" are deleted from the tree, a tree composed of nodes representing the message elements targeted to the ultimate receiver is obtained. It is also true for the nodes representing message elements with role "None". So, it can be seen that from the tree of a message three different trees corresponding to the three different roles can be extracted.

According to still a further aspect, each attack preventing header block carrying information about certain signed message elements also may be assigned a role attribute corresponding to the role attribute of those signed message elements.

According to a further aspect, the pre-order traversal list used to calculate the digest value included by an attack preventing header block may be based on one of the first, the second and the third tree, respectively, in dependency of the role attribute of the respective attack preventing header block.

Furthermore, it is possible that an attack preventing header block contains as two of its attributes a role attribute and a node_number. The role attribute specifies for which role's tree (as discussed before) this attack preventing header block contains information and the node_number specifies which node created this attack preventing header block. That is to say that besides the sender also the intermediaries are capable of adding signed message elements and thus, creating and adding at least one corresponding attack preventing header block.

Therefore, in case of a SOAP message, each SOAP node, particularly in case that it intends to add some signed message elements to the SOAP message, can create three attack preventing header blocks corresponding to the three roles. Then, the node can extract three trees corresponding to the three roles from the tree representation of the SOAP message, as described before. Let the attack preventing header block for role "UltimateReceiver" is h_1, for role "Next" is h_2 and for "None" is h_3. It is further assumed that the tree for role "UltimateReceiver" is t_1, for role "Next" is t_2 and for role "None" is t_3. Now h_1 can be filled up with information from t_1, h_2 can be filled up with information from t_2 and h_3 can be filled up with information from t_3. Then the SOAP node may sign the three attack preventing header blocks and may append them to the outbound SOAP message.

When an intermediary will receive a SOAP message, it may retrieve the attack preventing header block with role attribute value "Next". Then, it may take the node_number from this attack preventing header block. Let this node number be x. It may get all the signed message elements added by node x from the attack preventing header block.

Then, it may find all the unsigned message elements added by node x for role "Next". The Id format can be defined according to a rule for the creation of the Id of an unsigned message element. Each SOAP node can create the Id for an unsigned message element as follows Unsigned_element_id=node_number.element_role. random_integer That is, the Id may be composed of three parts separated by a dot, the number of the SOAP node who is creating the Id, a role attribute's integer value of the element for which the Id is being created, a random integer value so that the resulting Id is unique within the XML message.

Thus, a node may determine all the unsigned message elements. Then, it may verify for each signed message element its name and depth, parent's Id and parent's name. If it is successful, it may form the tree with the determined signed and unsigned message elements added by node x, make the pre-order traversal list of the tree, take the digest value of the traversal list and compare it with the digest value present in the corresponding attack preventing header block. If the two match, the verification succeeds. Otherwise an error is generated. Moreover, after processing the respective attack preventing header block, the node may remove it.

The processing for the ultimate receiver may be the same as for the intermediaries. However, instead of processing only the attack preventing header block with role attribute's value "Next", the ultimate receiver may process all of the attack preventing header blocks.

According to still a further aspect, the attack preventing header blocks may be signed. It is possible that the so-called XPath expression is used to reference the attack preventing header blocks from a signature element of a SOAP message, respectively.

As discussed above, in order to protect a message from an XML rewriting attack, a sender may send some information regarding the structure of the message to a corresponding receiver. Therefore, a new header block has been introduced to carry these information and this header block is named as attack preventing header block or also as RewritingHealer. In the drawings, a possible detailed structure of this RewritingHealer will be presented.

Furthermore, it may be possible that each attack preventing header block is formed according to an overall structure, the structure comprising at least a group of mandatory attributes and a group of child elements, wherein the group of mandatory attributes comprises at least an attribute indicating an Id of the respective attack preventing header block, the role attribute of the respective attack preventing header block, an attribute indicating a specification of a creator node of the respective attack preventing header block, and the group of child elements comprises at least an element containing information regarding the respective signed message elements and an element containing a digest value of a pre-order traversal list of the message tree, the tree only representing message elements having the same role attribute as the respective attack preventing header block.

In another aspect, a distributed and decentralized network system is provided which is configured to protect a message exchange within the system from an XML rewriting attack, the message comprises a plurality of message elements including a number of signed message elements. The system may comprise at least an initial sender of the message which is configured to represent the message in a tree structure with an envelope as its root with at least two children, a body and a header, the header having a first attack preventing header block as at least one immediate child, and wherein message elements are represented by a unique ID attribute, respectively, and to send the message along with structure specific information of the message to a receiver, wherein the information is carried by the first attack preventing header block and comprises at least a digest value of a pre-order traversal list of the message tree and for each signed message element targeted to the receiver the ID attribute, a depth, a parent's name and the parent's ID attribute, so that the receiver when receiving the message can identify any XML rewriting attack against any one of the signed message elements by comparing the structure specific information which can be derived from the received message with the information carried by the attack preventing header block.

Within the scope of the present disclosure, a SOAP message, as already indicated, may be representative for SOAP messages and all kind of messages which are similarly structured.

It is possible that, in case the message traverses when being sent to a receiver at least one intermediary for which the message contains signed message elements, the message may be provided with at least a second attack preventing header block carrying corresponding structure specific information regarding the signed message elements targeted to the at least one intermediary.

In case the message traverses when being sent to a receiver a plurality of intermediaries for each of which the message contains signed message elements, respectively, the message can be provided with a corresponding plurality of attack preventing header blocks, each carrying respective structure specific information regarding the signed message elements targeted to one of the intermediaries, respectively.

According to another aspect, the attack preventing header blocks may be signed. Thereby, XPath expression can be used to reference the attack preventing header blocks from a signature element of the message, respectively.

As already described before, it can be foreseen that each message element of the message is assigned a role attribute indicating its target server/node within the network system. Thereby, the role attribute can be one of the group consisting of "None"; "Next" indicating an intermediary, and "UltimateReceiver".

Furthermore, it can be provided that each message element is represented by a node of the tree structure of the message and each node is labeled with the respective role attribute such that a first, a second and a third tree corresponding to the respective role attributes can be extracted from the tree structure of the message.

Moreover, each attack preventing header block carrying information about certain signed message elements can be assigned a role attribute corresponding to the role attribute of those signed message elements.

Thus, the pre-order traversal list used to calculate the digest value included by an attack preventing header block can be based on one of the first, the second and the third tree, respectively, in dependency of the role attribute of the respective attack preventing header block.

According to still a further aspect, the system may further comprise a receiver which is configured to receive structure specific information of the message from the initial sender or an intermediary, wherein the information is carried by a corresponding attack preventing header block and comprises at least a digest value of a pre-order traversal list of the message tree and for each signed message element targeted to the receiver the name and the ID attribute, a depth, a parent's name and the parent's ID attribute, and the receiver is further configured to identity when receiving the message any XML rewriting attack against any one of the signed message elements by comparing the structure specific information which can be derived from the received message with the information carried by the attack preventing header block.

The receiver may know a priori how to compute the respective digest value based on the structure specific information derived from the received message.

The receiver may be an ultimate receiver of the message.

Alternatively, the receiver may be an intermediary which is passed by the message when being sent to an ultimate receiver of the message.

In a further aspect, the system may further comprise an intermediary which is configured when being passed by the message to extend the message and to send structure specific information of the extended message to a receiver, wherein the information is carried by a further attack preventing header block and comprises at least a digest value of a pre-order traversal list of the extended message tree and for each signed message element added by said intermediary and targeted to the receiver the name and ID attribute, a depth, a parent's name and the parent's ID attribute, so that the receiver when receiving the message can identify any XML rewriting attack against any one of the signed message elements by comparing the structure specific information which can be derived from the received message with the information carried by the attack preventing header block.

It is possible that the first attack preventing header block may further comprise information about a point in time at which the initial sender creates the first attack preventing header block.

Furthermore, the first attack preventing header block may comprise an identifier for the message which can be used for correlation of responses.

A computer program is provided with a program code which is suitable for carrying out a method as described before when the computer program is run on a computer.

Another aspect further proposes a computer-readable medium with a computer program stored thereon, the computer program comprising a program code which is suitable for carrying out a method as described before when the computer program is run on a computer.

The proposed approach may eliminate the necessity of WS Security policy for the detection of XML rewriting attack. In WS Security policy, for each assertion there has to be a module to verify whether a message satisfies the assertion or not. Therefore, if there are a lot of assertions in the WS Security policy, each module for these assertions has to process the SOAP message. This may be a time consuming procedure.

Further features and embodiments will become apparent from the description and the accompanying drawings.

For the purpose of clarity, the present discussion refers to an abstract example of a method and a system, respectively. However, implementations of the method and the system may operate with a wide variety of types of network systems including networks and communication systems dramatically different from the specific example as illustrated in the following drawings.

It should be understood that while details of one or more implementations are described in terms of a specific system, further implementations may have applications in a variety of communication systems, such as advanced cable-television systems, advanced telephone-networks or any other communication systems that would benefit from the system or the method. It is intended that the system as used in this specification and claims is realizable within any communication system unless the context requires otherwise.

Implementations are schematically illustrated in the drawings and explained in detail with reference to the drawings. The drawings illustrate implementations of the proposed method and the proposed system, respectively, using SOAP technologies and principles. It is to be understood that the description is in no way limiting and is merely an illustration of various implementations.

It will be understood that the features mentioned above and those described hereinafter can be used not only in the combination specified but also in other combinations or on their own, without departing from the scope of the present disclosure.

The details of one or more implementations are set forth in the accompa-nying drawings and the description below. Other features will be apparent from the description and drawings, and from the claims.

BRIEF DESCRIPTION OF THE DRAWINGS

FIGS. 1.1 and 1.2 show a first exemplary SOAP message as it is intended to be sent by a client to a server (FIG. 1.1) and as it can be tampered by an attacker (FIG. 1.2).

FIGS. 2.1 and 2.2 show a second exemplary SOAP message as it is intended to be sent by a client to a server (FIG. 2.1) and as it can be tampered by an attacker (FIG. 2.2).

FIGS. 3.1 and 3.2 show a third exemplary SOAP message as it is intended to be sent by a client to a server (FIG. 3.1) and as it can be tampered by an attacker (3.2).

FIGS. 4.1-4.8 show several exemplary SOAP messages together with corresponding security policy requirements as well as how an attacker can bypass the security requirements, respectively.

FIGS. 5.1-5.4 show the use of so-called SOAP accounts for detecting XML rewriting attacks on the SOAP message as shown in FIG. 1.1 and how SOAP accounts can become vulnerable to XML rewriting attacks.

FIGS. 6.1 and 6.2 show a tree representation of the SOAP message as shown in FIG. 4.1 (FIG. 6.1) and a tree representation of a further SOAP message together with a possible rewriting attack without changing the depth of a message element (FIG. 6.2).

FIG. 11 shows an overall structure of a attack preventing header block.

FIGS. 12.1 and 12.2 show a SOAP message that has been processed using an attack preventing header block (FIG. 12.1) and an attempt of an attacker to tamper it (FIG. 12.2).

FIGS. 13.1 and 13.2 show another exemplary SOAP message with two attack preventing header blocks (FIG. 13.1) and an attempt of an attacker to tamper it (FIG. 13.2).

FIG. 15 shows a simple web service application.

FIG. 16.1-16.3 show a scenario of a specific service called MathService where FIG. 16.1 shows a graphical user interface for this service; FIG. 16.2 shows an interface of a RewritingHealer Verifier; and FIG. 16.3 shows an interface of a RewritingHealer Verifier detecting an XML rewriting attack.

DETAILED DESCRIPTION

FIGS. 6.1 and 6.2 show a tree representation of the SOAP message previously presented in FIG. 4.1. As discussed above, a tree representation of a SOAP message may have an envelope "Envelope" as its root. The root may have one or two children—a body element "Body" and a header element "Header". In FIGS. 6.1 and 6.2, the header element has two children—a security element "Security" and a "Reply To" element and the body has one child, a "getQuote" element. The security element has further a child, namely a signature element "Signature" which in turn has a child, namely a "SignedInfo" element. The "SignedInfo" element has two children, namely two reference elements "Reference". It will be explained now what happens to this tree when an attacker performs an attack. As already defined before, the depth of a message element in a tree may be the length of the path from the root of the tree to the message element. Therefore, the depth of one of the reference elements is 5. If an attacker wraps up a signed message element using a so-called fake element, then the depth of the signed message element may be changed. For instance, in FIG. 6.1, if the attacker moves the element "Reply To" under a fake header then the depth of the "Reply To" element will be changed from 2 to 3. Therefore, this sort of attack may be detected by just keeping track of the depth information of all of the signed message elements.

FIG. 6.2 shows how a message element can be relocated without changing its depth. As discussed before, a SOAP message may have multiple header elements with the same name. An example of this sort of header element is the security header element, which is specified in WS-Security, as further described in "Web Services Security: SOAP Message Security 1.0 (WS-Security 2004) OASIS Standard 200401, March 2004". However, WS-Security imposes a restriction regarding the role of security header elements. According to this specification, no two security header elements can have the same value for their role attribute. The default role attribute's value for a header element is "UltimateReceiver". Moreover, one can explicitly specify the role attribute value for a header element as "UltimateReceiver". Therefore, there can be two security header elements targeted for the ultimate receiver. Beside this security header element, an application can define its own header element and allow multiple instances of this header element to exist in one SOAP message. Referring again to FIG. 6.2, the SOAP message contains two security header elements. One of the security header elements contains a timestamp element "Timestamp", which is signed. The depth of this signed timestamp element is 3. If the attacker cuts this element and pastes it as indicated by arrow A under another security header element, which has role attribute value of "None", the depth of this timestamp element will still remain 3.

Figure 7:
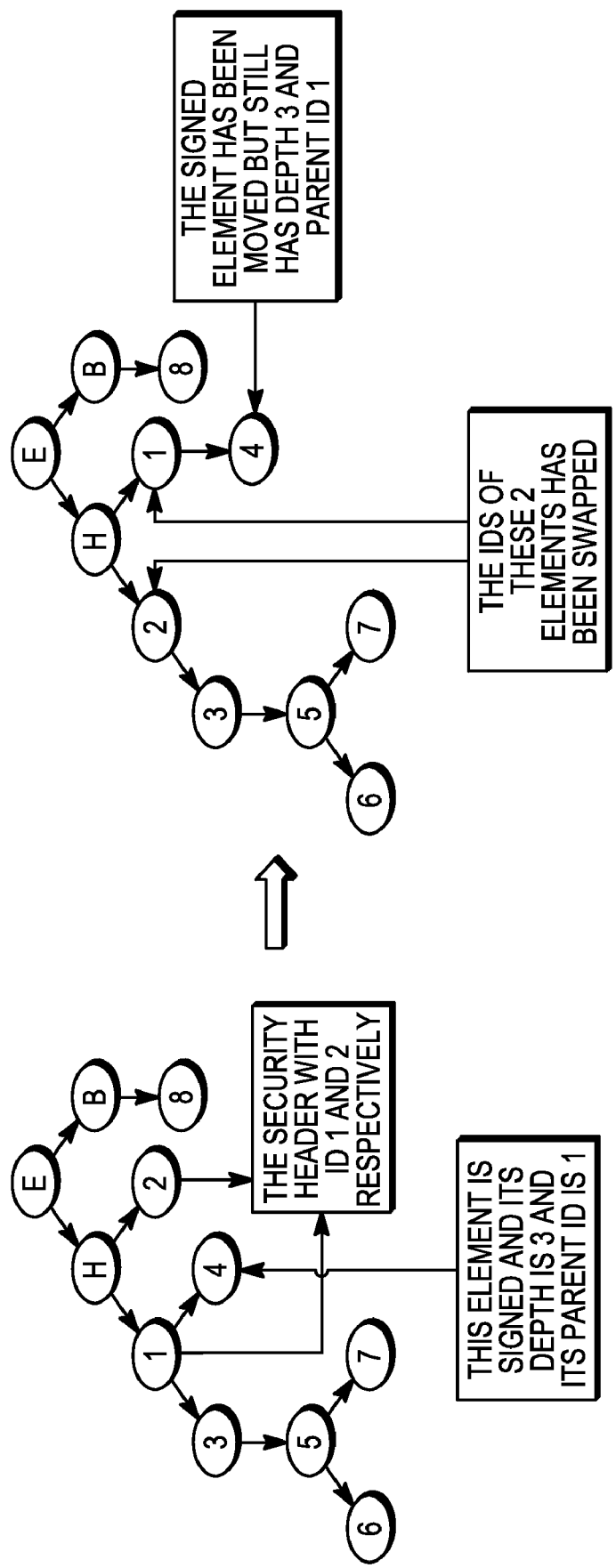
FIG. 7 shows how a message element can be relocated without changing its depth and its parent's Id.

FIG. 7 shows how a message element can be relocated without changing its depth and its parent Id. WS-Security defines an Id attribute for uniquely identifying a message element. This Id attribute is generally used as follows:

<anyElement wsu:Id="...">...</anyElement>wsu:Id is of type xsd:ID. WS-Security also specifies that two elements within a document may not have the same wsu:Id value. Therefore, this ID attribute may be used for uniquely referencing the parent of a signed message element.

However, keeping track of the depth and the parent Id of a signed message element may not be sufficient in order to avoid the above described attack, because the parent may have its own parent, that parent may have its own parent and so on. Moreover, as the parent is not signed, the attacker can also change its Id. FIG. 7 shows how a signed message element can be relocated without changing its depth and its parent Id. This figure actually represents the SOAP message of FIG. 6.2. However, the message elements are represented here by their Ids instead of their name. The Id of the envelope is "E", the header is "H" and the body is "B". These three Ids may be fixed for SOAP messages. Other Ids may be chosen randomly so that they don't collide.

As it can be seen from FIG. 6.2, the signed message element has Id 4 and its depth is 3. The parent of this message element has Id 1. An attacker can cut the signed message element and paste it under the message element with Id 2. It does not change the depth of the signed message element; however, it changes its parent's Id. Therefore, the attacker swaps the Id of the signed message element's parent with the signed message element's parent's sibling. Now the signed message element's depth and parent Id became as before. So keeping depth and parent Id information may not be of much help. Keeping the Ids of the siblings also may not restrain the attacker from relocating the signed message element as the attacker can also manipulate the siblings Ids if they are not signed. It should be noted here that the attacker could also create a new message element with a unique Id or delete an unsigned message element from the SOAP message.

Figure 8:
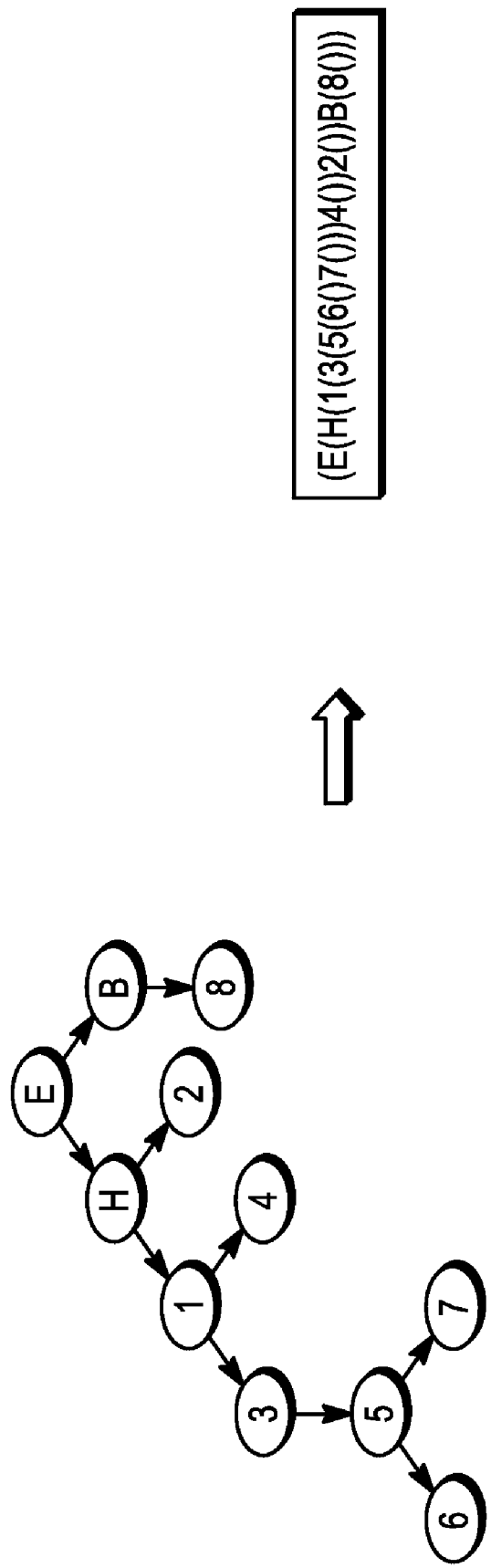
FIG. 8 shows a pre-order traversal of a tree and its string representation.

FIG. 8 shows a pre-order traversal of a message tree and its string representation. It will be explained now in detail how such a pre-order traversal can be computed. First of all, every message element of the message may be given a unique Id. In the case described here, there are two SOAP nodes, an initial sender and an ultimate receiver. As described before, the attacker may create or delete message elements from a SOAP message. In order to restrain the attacker from doing so, a digest value method may be used in this regard. A string can be created, for example, by concatenating the Ids of a SOAP message. This can be done by using a so-called pre-order traversal technique of the tree. In the pre-order traversal of the tree, the root is traversed first, then the children of the root are traversed from left to right order. This traversal technique can be recursively defined as follows:

$$\text{Traverse}(t) = \begin{cases} 0 & \text{if } t \text{ is an empty tree} \\ (r(t_1, t_2, t_3, \ldots t_n)) & \text{if } t \text{ is a tree with root } r \\ & \text{and the children of } r \text{ are} \\ & t_1, t_2, \ldots t_n \text{ in left} \\ & \text{to right order} \end{cases}$$

FIG. 8 shows the pre-order traversal of a list and how this traversal list can be represented as a string. The original tree may be built up again if given with this sort of traversal list.

The element addition and deletion attack has been removed by using such a message digest technique. As the traversal list may be unique for a tree, if the attacker just cuts and pastes elements from its original position to another, the traversal list may be changed which would result in the change of the corresponding digest value. Moreover, the attacker may not change the depth of a message element.

For instance, let the absolute path of a message element m from the root be:

AbsolutePath (m)=r, x, y, z, m

The depth of message element m is 4. Now, if the depth of message element m is to be changed, a new node may be introduced or some existing node may be removed from the absolute path of m. However, if this modification is done, it may change the traversal list of the tree, which may result in the change of the corresponding digest value.

However, the attacker can change the name of message elements. In this case, the traversal list may not change and consequently the digest value also may not change. As a countermeasure of this modification problem, not only the Id of a message element is taken but also the name of that message element while creating the traversal list. The name of a message element can be combined with its Id in the following way:

Element Identifier=ElementName:ElementId

Now the attacker may only change the Id and name of unsigned message elements but may not change the Id or name of signed message elements. Therefore, this digest method may not allow the attacker to relocate or modify any signed message element of a SOAP message. The signed message elements may be protected against the rewriting attack.

To protect a signed message element of a SOAP message against an XML rewriting attack, the following pieces of information may be used:
  the name of the signed message element
  the Id of the signed message element
  the depth of the signed message element
  the parent's name and Id of the signed message element
  the digest value of the pre-order traversal list of the SOAP message tree.

The above information, except the first one, may be sent from the sender to the receiver in a header block, which is designated as an attack preventing header block or, as used in the following, as a RewritingHealer header block. The structure of this header block is described in FIG. 11. It has to be taken into account that this header block could itself become the subject of an XML rewriting attack. To preclude this attack, the following restriction regarding the location and the signature of the header block may be imposed:

The RewritingHealer header block may be signed. Additionally, XPath expression may be used to reference the RewritingHealer header block from the signature element.
  The RewritingHealer header block may exist as an immediate child of the header of the SOAP message.
  Messages should contain this RewritingHealer header block. Even if a message does not have any signed message element, it should contain the RewritingHealer header block with no information regarding signed message elements.

If the above conditions are enforced correctly, an attacker may not be able to relocate or modify the RewritingHealer header block. The RewritingHealer header block may be referenced using XPath expression. The rest of the SOAP message elements may be signed using any referencing technique.

So far, two SOAP nodes have been considered, the sender and the ultimate receiver. However, according to SOAP specification, a SOAP message can traverse zero or more intermediaries before reaching the ultimate receiver. Thus, the existence of the intermediaries has to be considered. According to the general SOAP processing model, each SOAP node, that means each server, including the sender, the ultimate receiver and any intermediary which are involved in a transfer of a SOAP message, may assume a role while processing the SOAP message. There are SOAP defined roles and also application defined roles. The role of a SOAP node may determine which header blocks it should process. Header blocks may contain a role attribute that is used to target it for a SOAP node. This role attribute may assume one of three possible values. These values are "Next", "UltimateReceiver" and "None". When a SOAP node finds that the role attribute's value of a header block matches the role it has assumed, it might process the block. The ultimate receiver of the message may assume the roles "UltimateReceiver" and "Next". The intermediaries may assume the role "Next". If the role attribute's value of a header block is "None", it means that any SOAP node on its path should not process this header block. In other words, no SOAP node can assume the role "None". The default role attribute's value for a header block is "UltimateReceiver". That is, if a header block does not contain any role attribute's value, its role attribute's value may be considered as "UltimateReceiver". It is assumed that the children of a header block may inherit the role of its parent.

A SOAP intermediary may process the header blocks targeted for it. It may not remove or reorder any header blocks that is not targeted to it. The intermediaries may remove header blocks with role attribute's value "Next". Moreover, it can append its own header blocks. But this modification does not change the relative order of the header blocks targeted to the ultimate receiver. The body of the SOAP message may be targeted to the ultimate receiver. A function, which may map a role name to a positive integer value can be defined as follows:

$$f(x) = \begin{cases} 1 \text{ if } x \text{ is Ultimate Receiver} \\ 2 \text{ if } x \text{ is Next} \\ 3 \text{ if } x \text{ is None} \end{cases}$$

Figure 9:
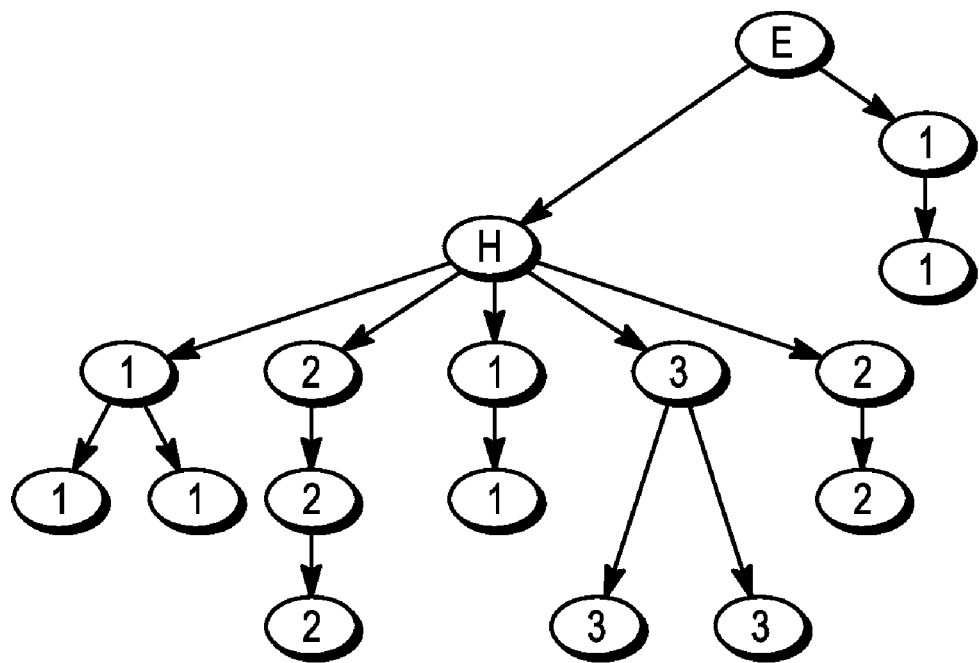
FIG. 9 shows a tree representation of a SOAP message, wherein each node is labeled with a role's integer value.

Now if a SOAP message is represented using a tree structure and each node of the tree is labelled with the role attribute's integer value of the corresponding message element, it may look something like FIG. 9. An element may inherit the role of its parent.

It should be noted that the envelope and the header of a SOAP message may not have any role; therefore, they are represented using their Id E and H, respectively. The nodes of the tree in FIG. 9, except the nodes with label E and H, have one of three labels 1, 2 or 3.

Figure 10:
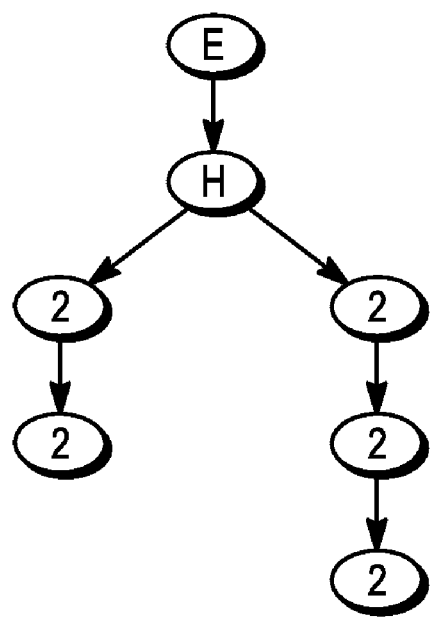
FIG. 10 shows a tree only representing nodes corresponding to message elements targeted to an intermediary.

Now if the nodes from the tree in FIG. 9, except the nodes with label 2 and the nodes with label E and H, are deleted, a tree results which may represent the message elements of a SOAP message that are targeted to an intermediary. The resulting tree is shown in FIG. 10. In the same manner, if the nodes from the tree of FIG. 9 are deleted, except the nodes with label 1, a tree results which is composed of nodes representing the message elements targeted to the ultimate receiver. It also may be true for the nodes representing message elements with role "None".

Therefore, it can be stated that from the tree of a SOAP message three different trees corresponding to the three different roles may be extracted. Moreover, each SOAP node may be assigned a number starting from 0. Each SOAP node may determine this number itself by looking at how many SOAP nodes have processed the SOAP message previously. A SOAP node may get this information from the attack preventing header block.

A rule for the creation of the Id of an unsigned message element can further be defined. Each SOAP node may create the Id for an unsigned message element as follows:

Unsigned_element_id=node_number.element_role.random_integer

That is, the Id may be composed of three parts separated by a dot, the number of the SOAP node who is creating the Id, the role attribute's integer value of the message element for which the Id is being created, a random integer value so that the resulting Id is unique within the document.

The above Id format may allow the receiver of a SOAP message in identifying, which SOAP node has added which unsigned message elements and which message element is added for which role. For the signed message element this Id format may not be needed, because the corresponding attack preventing header block may contain the Id for each signed message element and from this information the receiver can identify, which signed message elements have been added by which SOAP node and for which role the message element was added. Two of the attributes of an attack preventing header block may be "role" and "node_number". The role attribute specifies for which role's tree this attack preventing header block contains information and the node_number specifies which SOAP node created this attack preventing header block.

Therefore, each SOAP node may create three attack preventing header blocks corresponding to the three roles. Then, the node may extract three trees corresponding to the three roles from the tree representation of the SOAP message, as described before. Let the attack preventing header block for role "UltimateReceiver" be h_1, for role "Next" is h_2 and for "None" is h_3. It is further assumed that the tree for role "UltimateReceiver" is t_1, for role "Next" is t_2 and for role "None" is t_3. Now h_1 may be filled up with information from t_1, h_2 may be filled up with information from t_2 and h_3 may be filled up with information from t_3. Then, the SOAP node may sign the three attack preventing header blocks and may append them to the outbound SOAP message.

When an intermediary will receive a SOAP message, it may retrieve the attack preventing header block with role attribute value "Next". Then the intermediary may take the node_number from this attack preventing header block. Let this node number be x. The intermediary may get the signed elements added by node x from the attack preventing header block. Then, the intermediary may find the unsigned message elements added by node x for role "Next". The Id format, as specified before, helps a node to determine the it. Then, the intermediary may verify the signed message elements depth, parent's Id and parent's name. If it is successful, it may form the tree with the determined signed and unsigned message elements added by node x, make the pre-order traversal list of the tree, take the digest value of the traversal list and compare it with the digest value present in the attack preventing header block. If the two match, the verification succeeds. Otherwise an error may be generated. Moreover, after processing the attack preventing header block the node may remove it.

The processing for the ultimate receiver may be the same as for the intermediaries. However, instead of processing the attack preventing header block with role attribute's value "Next", the ultimate receiver may process all of the attack preventing header blocks.

FIG. 11 shows an overall structure of a proposed attack preventing header block. The attack preventing header block may contain some attributes and some child elements which are exemplarily named as follows:

RewritingHealer@ID: This attribute may contain the Id of a RewritingHealer header block;

RewritingHealer@Role: This attribute may specify which SOAP node should process a particular RewritingHealer header block. It also may specify that this RewritingHealer header block contains information for the message elements whose role attribute' value is the same as this RewritingHealer's role attribute.

RewritingHealer@NodeNumber: This attribute may specify the node that created a particular RewritingHealer header block with a positive integer value.

RewritingHealer/Time: This child element may contain the time at which the sender created the RewritingHealer header block. Each subsequent time may have monotonically increasing value. This element may be used for a protection against a store and replay attack. Moreover, the initial sender may add this element in its RewritingHealer header block whose role attribute's value is "UlimateReceiver". That means the node with number 0 may add this element.

RewritingHealer/MessageID: This element contains an identifier for the RewritingHealer header block. A client can use this element for the correlation of responses. A server copies the MessageID of the request into a response so that the client can correlate the response with the request. The initial sender may create this element in the RewritingHealer header block whose role attribute's value is "UlimateReceiver".

RewritingHealer/SignedElementInfo: This element contains information regarding the signed elements of a SOAP message, which has the same role attribute's value as the RewritingHealer's role attribute's value;

RewritingHealer/SignedElementInfo/ID: This element specifies the Id of a signed message element;

RewritingHealer/SignedElementInfo/Depth: This element specifies the depth of a signed message element with the above Id;

RewritingHealer/SignedElementInfo/ParentName: This element specifies the name of the parent of a signed message element with the above Id;

RewritingHealer/SignedElementInfo/ParentID: This element specifies the Id of the parent of a signed message element with the above Id;

RewiritingHealer/TraversalDigest: This element is a container for the digest value of the pre-order traversal of a tree;

RewritingHealer/TraversalDigest/DigestValue: This element contains the digest value. SHA-256 algorithm may be used to create this digest value. The digest value can be created on the string representation of the pre-order traversal list of a tree as described before. This tree may be composed of nodes which represent message elements of a SOAP message that have the same role attribute's value as this RewritingHealer's role attribute value.

FIG. 12.1 shows a SOAP message that has been processed using the previously described creation rule for an attack preventing header block. Every unsigned message element has been given a unique Id. The message contains an attack preventing header block. This header block has NodeNumber attribute's value of 0 as it has been created by the initial sender and role attributes value of 1 as it contains information regarding the message elements of the SOAP message targeted to the ultimate receiver.

The SOAP message of FIG. 12.1 contains two signed header elements with Ids id-1 and id-4. Therefore, the attack preventing header block, called herein RewritingHealer header block, contains two <SignedElementInfo> elements. These two <SignedElementInfo> elements contain information regarding the two signed header elements. The <DigestMethod> element indicates that for digest value computation SHA-256 is used. The digest value is calculated on the following string, which is the pre-order traversal string for the SOAP message of FIG. 12.1:

(Envelope:E (Header:H(A:Id-1( )D:Id-4( )B:0.1.1(C: 0.1.2( ))Security:0.1.6(BST:0.1.4( )))
Body:0.1.6(G:0.1.7( )))

Suppose an attacker has intercepted the SOAP message of FIG. 12.1 and he wants to modify it. FIG. 12.2 shows how the attacker may modify the message. The attacker neither deleted nor introduced any element in the SOAP message. He just re-ordered the signed header elements. In FIG. 12.2, the two signed header elements are shown in bold. As it can be seen from FIG. 12.2, none of the information that is present under the <SignedElementInfo> element of the RewritingHealer header block can detect the modification made by the attacker. This is because the modification may not have any effect on this information. It will be shown now what happens to the digest value. The receiver will now calculate a digest value on the following string, which is the pre-order traversal string for the SOAP message of FIG. 12.2:

(Envelope:E(Header:H(D:Id-4( )A:Id-1(B:0.1.1(C:0.1.2 ( )Security:0.1.6(BST:0.1.4( ))
Body:0.1.6(G:0.1.7( )))

It can be seen that this traversal string is not equal to the traversal string shown before. Therefore, according to the feature of the SHA-256, the new calculated digest value will not be equal to the one that is present in the received SOAP message. So, the receiver may detect the tampering.

FIG. 13.1 shows another exemplary SOAP message. However, this SOAP message may contain some data targeted to the ultimate receiver and the rest targeted to an intermediary. Therefore, the message contains two RewritingHealer header blocks. Both of them have the same NodeNumber attribute's value, but they have a different value for the role attribute. RewritingHealer header block with role attribute's value of 1 contains information regarding the message element targeted to the ultimate receiver and with role attribute's value of 2 contains information regarding the message element targeted to the intermediary. The digest value for the RewritingHealer header block with role attribute's value of 1 is calculated on the following string:

(Envelope:E(Header:H(B:0.1.1 (C:0.1.2( )D:Id-4( ))Security:0.1.6(BST:0.1.4( )))
Body:0.1.6(G:0.1.7( ))))

On the other hand the digest value for the RewritingHealer header block with role attribute's value of 2 will be calculated on the following string:

(Envelope:E(Header:H(A:Id-1( )))

It is supposed now that the attacker intercepted the message of FIG. 13.1. Now the attacker wants to modify the message. As it can be seen from the intercepted SOAP message, it contains one header element with name B and Id 0.1.1. This header element contains two children with name C and D. The D child is signed. At first, the attacker creates a new header element with name B. As stated before that each unsigned message element of a SOAP message would be given a unique Id by the RewritingHealer creation process, the attacker has to provide this new message element with an Id. Moreover, it is stated previously that no new Id could be created; otherwise, it will have effect on the digest value. The only way left for the attacker is to delete an existing unsigned message element and give the newly created message element the Id of the deleted message element. Therefore, the attacker deleted the unsigned message element with name C and Id 0.1.2 and gives the newly created message element this Id. Now he cuts the signed message element with name D and Id id-4 and pastes it under the newly created unsigned message element B.

When the intermediary will receive the above message, he may verify the information present in the RewritingHealer header block with role attribute's value of 2. Therefore, the intermediary may not identify this tampering of the attacker as previously described as none of the message elements targeted for the intermediary has been forged. However, when the ultimate receiver will receive the modified SOAP message, he may be able to identify the tampering in two different ways. First of all, he can identify the modification by verifying the information that is present under the <SignedInfoElement> of the RewritingHealer header block whose role attribute value is 1. This is because, although the parent's name of the relocated message element is still the same, the parent's Id has been changed. The second way of identifying this modification is the digest value comparison. Because of the modification of the SOAP message, the traversal string of the modified message may not be equal to the one of the original. Consequently, their digest value will be different as well. Therefore, by computing the digest value and comparing it with the one present in the SOAP message, the ultimate receiver may identify the tampering.

In the following section a processing rule for an attack preventing header block, also called RewritingHealer header block will be seen. It will be explained how such an attack preventing header block can be created and verified by different SOAP nodes like intermediaries and ultimate receiver. In the description of the processing rule "the role of an element" means the value of the role attribute of that message element. However, if the message element does not have such a role attribute, it means the role attribute's value may be inherited from its parent as explained before.

Creation Rule for an attack preventing header block also called RewritingHealer header block:

1. Determine the node number of the actual SOAP node which will create such an attack preventing header block. Let the number is NN.
2. For each unsigned element UE do step 3 to 7.
3. If UE contains an Id then do 4 to 5.
4. If the Id is not referenced from anywhere of this document then remove it and go to step 6.
5. Change the Id of UE to NN.R.I, where NN is the current node number, R is the role of the unsigned element, I is some random positive integer value unique within the current SOAP message. Adapt the reference element and go to step 8.
6. Create an Id IDUE of the form NN.R.I, where NN is the current node number, R is the role of the unsigned element, I is some random positive integer value unique within the current SOAP message.
7. Set the Id attribute's value of UE to IDUE.
8. Create an empty set of Ids. Let the set is PreviouslySignedElement.
9. For each existing RewritingHealer header block of this SOAP message do step 10.
10. Retrieve the Ids from all SignedElementInfo elements of the RewritingHealer header block and insert the Ids in the set PreviouslySignedElement.
11. For each role R in the set (UltimateReceiver, Next, None) do step 12 to 28.
12. Set IR=f(R), where f maps a role R to a positive integer.
13. Get a unique ID value Id.
14. Create a RewritingHealer header block with ID=Id, Role=IR, NodeNumber=NN and prepend it under the header of the SOAP message. If the SOAP message does not contain a header then create it before prepending.
15. If NN is 0 and IR is 1 then do step 16 and 17.
16. Create a time element and insert the current time under this element and append this time element under the current RewritingHealer header block.
17. Create a MessageID element and insert a random integer number under this element. After that append this element under the current RewritingHealer header block. Put this MessageID in a buffer.
18. For each signed element SE with identifier Id in the SOAP message do step 19 to 22.
19. If Id is in the set PreviouslySignedElement go to step 18.
20. Determine the role R' of SE and compute f(R')=IR'. Also determine the depth D of SE, Parent's Name PN of SE and Parent's ID PID of SE.
21. If IR'!=IR go to step 18.
22. Create a SignedElementInfo element with ID=Id, Depth=D, ParentName=PN and ParentID=PID. After that append this element under the current RewritingHealer header block.
23. Create a tree with all the elements of the SOAP message that have role R" and f(R")=IR and that have been added by node with number NN. The tree will be rooted at the envelope element and the label of the root will be E. Moreover, the label of the node which will specify the header of the SOAP message will be H.
24. Compute a string S by making a pre-order traversal on the above tree.
25. Compute a digest value MD using SHA-256 on string S.
26. Create a TraversalDigest element an append it under the current RewritingHealer header block.
27. Create a DigestValue element and set its value with MD. Then append this element under the TraversalDigest element.
28. Sign the created RewritingHealer header block using XPath referencing.

RewritingHealer Header Block Verification Rule for Intermediaries

1. Retrieve the RewritingHealer header block HDR that has role attributes value "Next".
2. Check if HDR is signed or not. If it is signed go to next step else generate an error and terminate.
3. Create an empty set SEID.
4. Retrieve all the SignedElementInfo from HDR and put them in a set SE.
5. For each SignedElementInfo in SE do step 6 to 12.
6. Set D=Depth element value of SE.
7. Set PN=ParentName element value of SE.
8. Set PID=ParentID element value of SE.
9. Set MID=ID element value of ID.
10. Retrieve the element Elem with Id MID. Let the depth of this element is D', Name of the parent of this element is PN' and Id of the parent of this element is PID'.
11. Compare D with D', PID with PID' and PN with PN' for equality. If all of the comparisons succeed go to next step. Else generate an error message and terminate.
12. Put MID in the set SEID.
13. Create a set USEID with all the Ids of the unsigned elements in the SOAP message.
14. For each Id I in USEID do step 13 to 14.
15. Retrieve the role part IR from I.
16. If IR !=f(Next), where f maps a role name to a positive integer value, then remove this Id from USEID.
17. Create a tree T with all the elements with Id in SEID or USEID.
18. Create a string S with the pre-order traversal list of the above tree.
19. Compute digest value MD' using SHA-256 on the string S.
20. Retrieve the digest value MD present in HDR.

21. Compare MD with MD'. If they are equal go to next step else generate error and terminate.

22. Remove HDR from the SOAP message.

RewritingHealer Header Block Verification Rule for Ultimate Receiver

1. Retrieve the time T and MessageID MID from the RewritingHealer header block which has NodeNumber attribute's value 0 and role attribute's value "UltimateReceiver".

2. Fetch the last time LT value from a cache which was sent from the same location as the current request.

3. If LT>=T then generate an error and terminate. Else go to next step.

4. Store T in the cache as LT.

5. Put MID in a buffer to be sent with the response.

6. For each role R in the set {UltimateReciever, Next, None} do step 7 to 28.

7. Retrieve the RewritingHealer header block HDR that has role attributes value R.

8. Check if HDR is signed or not. If it is signed go to next step else generate an error and terminate 9. Create an empty set SEID.

10. Retrieve all the SignedElementInfo from HDR and put them in a set SE.

11. For each SignedElementInfo in SE do step 12 to 18.

12. Set D=Depth element value of SE.

13. Set PN=ParentName element value of SE.

14. Set PID=ParentID element value of SE.

15. Set MID=ID element value of ID.

16. Retrieve the element Elem with Id MID. Let the depth of this element is D', name of the parent of this element is PN' and Id of the parent of this element is PID'.

17. Compare D with D', PID with PID' and PN with PN' for equality. If all of the comparisons succeed go to next step. Else generate an error message and terminate.

18. Put MID in the set SEID.

19. Create a set USEID with all the Ids of the unsigned elements in the SOAP message.

20. For each Id I in USEID do step 21 to 22.

21. Retrieve the role part IR from I.

22. If IR !=f(R), where f maps a role name to a positive integer value, then remove this Id from USEID.

23. Create a tree T with all the elements with Id in SEID or USEID.

24. Create a string S with the pre-order traversal list of the above tree.

25. Compute digest value MD' using SHA-256 on the string S.

26. Retrieve the digest value MD present in HDR.

27. Compare MD with MD'. If they are equal go to next step else generate error and terminate.

28. Remove HDR from the SOAP message.

It is to be stated that each node which is involved in the transfer of a SOAP message, that means the sender, the ultimate receiver and any intermediary, has an attack preventing processing module which is responsible for processing the proposed attack preventing header blocks. That means that such a module has to manage the attack preventing header blocks, including their creation and their verification, respectively.

When generating a response for a respective client the attack preventing processing module, in the following also called RewritingHealer processing module, may go through the following operations:

1. Create an empty RewritingHealer header block and append it under the header of a SOAP response message. If no header is present, create a new header and then append it.

2. Fetch the MessageID MID that was present in the last request SOAP message and that was kept in a buffer.

3. Create a MessageID element under the RewritingHealer header block and set its value with MID.

4. Sign the RewritingHealer header block.

After getting the response, the RewritingHealer processing module on the client side may verify the signature of the RewritingHealer header block. Then, it may take the MessageID from the header block and may try to correlate this MessageID with the last sent request MessageID. If it fails, it may generate an error.

The proposed method may be realized via a Java implementation. Axis, a SOAP processor engine, can be chosen for creation and processing of SOAP messages. For signature creation and verification an Apache XML Security library version 1.4 may be used. This library may implement the security standard for XML. Apache provides both Java and C++ implementation of this library. In the following, Tomcat 5.0 is used, which is a servlet engine for the deployment of both axis servlet and the proposed modules.

Apache Software Foundation has provided an implementation for SOAP. They have named it Axis. Axis is a SOAP engine, which provides a framework for constructing SOAP processors such as clients, servers, gateways, etc. This engine is currently implemented in Java. However a C++ implementation of this engine may be forthcoming. Presently, Axis engine is available in the following two different forms.

1. Axis engine as a servlet. This form of Axis engine may need to be deployed as an web application in a servlet engine like Tomcat.

2. Axis engine as a stand-alone server.

Axis does not only provide a SOAP processor. It also may provide a tool, Java2WSDL, for creating WSDL file from the Java code of a web service, a tool, AdminClient, for deploying web service in Axis, a tool, tcpmon, for monitoring SOAP message exchange between a client and a server and a tool, WSDL2Java, for creating client and server proxy. Recent version of Axis also may provide a web service called SOAPMonitor that can be used to monitor SOAP message exchange between client and server without changing the configuration file of the servlet engine.

The core processing logic of an Axis engine can be invoked in two different ways. It can be invoked by an application on client side, or by a transport listener on server side. Whoever calls it, once it is called, it creates a message context with the received message. This message context is a package that may contain a request or a response along with some properties. Then the core processing logic passes the message to a series of handlers. Each of these handlers processes the message and passes it to the next handler until it is reached to its ultimate destination, which may be a web service or a transport listener.

A handler can be thought of as a plug-in in an Axis engine. Handlers may be web services. The handlers intercept a SOAP message, process it in a predefined way and then pass it to the next entity. There may be three different types of handlers: Transport specific handler, global handler and service specific handler. SOAP messages can be exchanged using different transport mechanism like http, SMTP, ftp etc. The transport listener's job is to retrieve protocol specific data from a received message. With this data the transport listener creates a so-called Message object and packs it into a MessageContext object along with some properties. It also put the transport name, for instance http, in the MessageContext object. Once the message context is prepared it is passed to the Axis engine. The Axis engine first determines the type of transport by transport name. A transport is an object that can contain a request chain or a response chain or both of them. A chain is a sequence of same type of handlers. For instance, the transport handlers may be aggregated to form a transport chain and all the service handlers are aggregated to form a service chain. The message passes through all the transport handlers in the chain in turn. Once all transport handlers have processed the message, it is passed to the global chain. Global handlers are applicable for all messages. In this global chain there is a handler, which determines the service to be called from the URL. For instance from the URL "http://localhost:8080/axis/services/AirLineTicketService" it determines the service name AirlineTicketService. Once all the global handlers are done with the message, it is passed to the service chain. A service chain may contain request handlers and/or response handlers. However, at the end of the service chain there is always a Service Provider that implements the back end logic of the web service. Each service might have its own specific handlers. After the processing of the service chain, the message is routed to the target service. Although most of the web services generate response, not all of them do. If the target service generates a response, the response passes through the same path as before but in reverse order to the transport listener. The transport listener sends the message to the client. As can be seen from the discussion so far, a message passes through a series of handlers in turn once it gets into the Axis engine and before reaching the target service and vice versa. Each handler may have a specific method, which is called invoke( ). This method takes a MessageContext object as its argument. When the transport listener, or a handler wants to pass the message to the next handler it calls the invoke ( ) method of that handler. In which order the handler will be called depends on two factors 1. The configuration of the so-called deployment descriptor file of Axis. It will be seen later how this file is configured.
2. Whether the Axis engine is running on client or on server side.

A message flow through the Axis engine on client side is almost same as the message flow on server side however the flow path is reversed. The client application invokes, in this case, the core axis engine processing logic instead of the transport listener. Then the message context is passed to the request service chain, if it is present. In the request service chain the message passes through all the handlers. It should be noted here that the service chain does not contain any service provider as the service is provided by a distant service provider. After the service chain, if there is any global chain, it gets the message and passes it to the transport chain after processing. The handlers of transport chain process the message and send it to the remote node. When a response arrives, it passes through the same sequence of handler chain but in a reverse order.

A possible implementation of an attack preventing processing module, in the following called RewritingHealer processing module, is composed of two modules, an attack preventing creator module, in the following called a RewritingHealerCreator and an attack preventing verifier module, in the following called a RewritingHealerVerifier. The RewritingHealerCreator module takes a SOAP message, adds Id attributes to appropriate elements, generates a RewritingHealer header block with necessary information. The RewritingHealerVerifier module takes a SOAP message, extracts RewritingHealer header blocks from the message and verifies whether the information is correct or not.

The RewritingHealerVerifier module can be implemented as a handler for Axis engine. Previously, it was explained what is a handler and how it works in the context of Axis. A RewritingHealerCreator module can be implemented both as a handler of an Axis engine and as a general library.

Figure 14:
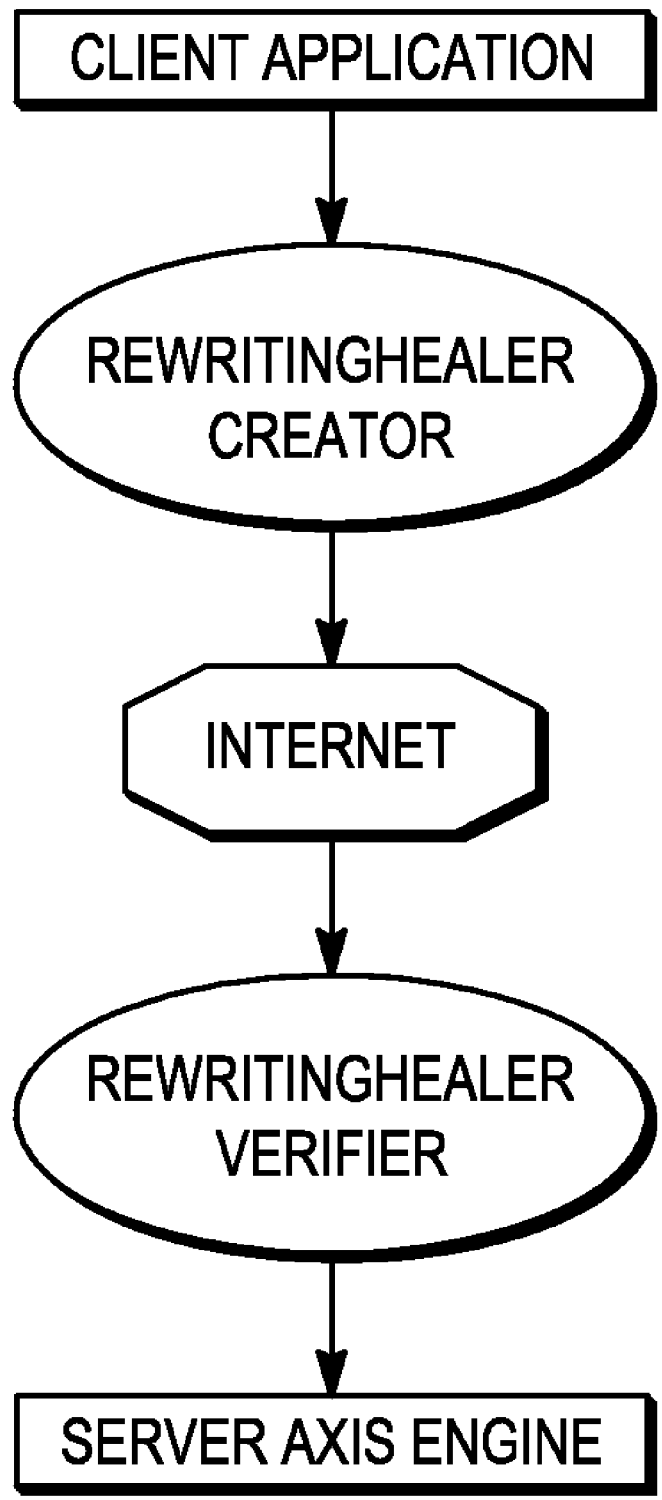
FIGS. 14 and 14.1-14.3 show a module structure of a possible implementation of an attack preventing header block.

From FIG. 14, it can be seen that when a client application sends a message to a server, the message first goes to the RewritingHealerCreator. If the client application is using the RewritingHealerCreator library, it has to call a method of that library with an envelope as the root element of a SOAP message it has prepared to send to the server. Then this library may append necessary information to this envelope and give it back to the client application. Then, the client application can send this message to the server.

On the other hand, if the client application wants to use the RewritingHealerCreator module as a handler of Axis engine it may have to configure a deployment descriptor configuration file of the Axis engine. At the same time, a stand-alone Axis engine, not Axis servlet, may be used if the client application wants to use the RewritingHealerCreator handler.

The RewritingHealerVerifier module may be available as a handler of Axis engine. To use this verification module for a service, it may be configured in the configuration file, server-config.wsdd, of the server side Axis engine. When the RewritingHealerVerifier gets the request SOAP message from the client application, it may determine its role and extract appropriate RewritingHealer header blocks from the received SOAP message. Then, it verifies this information. If it could not find any tampering, it let the message go, otherwise it generates a SOAP fault. There may be two other modules in the module structure of a RewritingHealer to append the received MessageID from the request SOAP message in the response SOAP message and to correlate a request MessageID with a response MessageID.

As mentioned before, each handler may have a special method called invoke( ). This method takes one argument namely MessageContext. The MessageContext encapsulates a message, which in turn encapsulates a request or a response message along with some properties. This method is the entry point to a handler. When one handler needs to pass the request or response message, it calls the invokes method of that handler. FIG. 14.1 shows a snapshot of the invokes method of the proposed RewritingHealerVerifier handler. As it can be seen from there this method throws an AxisFault if any tampering is found on the received message. In this method, some data structures are first initialised and the role of the current node is determined. Then a list containing all the Ids of the signed elements of the current SOAP message is created. After that the RewritingHealer header block(s) are retrieved from the SOAP message and the verify method is invoked. The snapshots of this verify method is shown in FIG. 14.2. This method returns a Boolean value depending on the status of the verification. If this method returns true then the handler lets the message go further, otherwise it generates an AxisFault. The proposed RewritingHealerVerifier can have a graphical user interface. This GUI shows the received SOAP message and the result of different types of verification like SignedElementInfo verification, digest value verification etc.

The RewritingHealerCreator module is available as both a general library and as an Axis handler. This handler is to be configured on the client side Axis engine. However, whether it is a general library or an Axis handler, both of them contain an invokes method. In the case of an Axis handler this method takes a MessageContext as its argument and in library this method takes an envelope as its argument. The rest of the working processes of these two modules are almost identical. FIG. 14.3 shows a snapshot of the invoke method of the RewritingHealerCreator module. The method takes an envelope as its argument. In the method, at first some data structures are initialized and the number of the current node is determined. Then two types of Id lists are created. One list contains all the Ids of the signed message elements, and the other contains Ids of signed message elements that were signed by some previous node. Then, this method creates another list which will contain the Ids of all the signed and unsigned message elements. After that this method gives all the unsigned message elements added by this node a unique Id of a specified form and creates RewritingHealer header blocks for different roles.

A simple web service application is shown in FIG. 15 to demonstrate how the proposed method can be used to detect an XML rewriting attack. The name of the proposed web service is MathService as it provides the service of different arithmetic operations like, addition, subtraction, multiplication, division and exponentiation. FIG. 15 shows the interface of the MathService. As it can be seen from FIG. 15, there are five methods in the web service, which performs the five mentioned arithmetic operations. Each of these methods take two arguments a and b. Although for the addition and multiplication operation the order of the arguments does not matter, for the rest of the operations it does. For instance, for any two integers a and b, (a-b) !=(b-a). Moreover, the client will send a request to this web service, it has to provide a signed subscriber ID as a header element of the SOAP message. This MathService has a handler which will validate a client using the subscriber ID.

A web service may be published using a web service description language (WSDL), which describes the different interfaces of a web service, its message format and their order etc. The WSDL file for the above mentioned web service is provided in Appendix A. In Axis every service may be deployed. There may be two ways to deploy a service in Axis. It is possible to use the AdminClient tool provided by Axis by configuring the server-config.wsdd deployment descriptor file of the server side Axis Engine. Using the second approach to deploy the web service in Axis, it may be needed to add the following lines in this server-config.wsdd file to deploy the web service. Line 001 specifies the name of the service and the type of message exchange pattern used by the service. RPC style of message exchange is used. That means a request/response style of message exchange. Line 002 to 003 specifies the methods provided by the service, the name of the main class of that service along with its package name and the scope.

Listing 1

```
001.  <service name="MathService" provider="java:RPC">
002.    <parameter name="allowedMethods" value="add subtract multiply divide exponent"/>
003.    <parameter name="className" value="com.thesis.service.MathService"/>
004.    <parameter name="scope" value="Session"/>
005. </service>
```

Once the web service has been deployed, any client can call this service and use the service. In the following, the proposed method may be used with the MathService for the protection against an XML rewriting attack. The RewritingHealerVerifier is a service specific handler. If a service wants to use it, it may have to configure it in the server-config.wsdd. This can be done by adding a couple of more lines with the lines in Listing 1. Listing 2 shows the resulting configuration information.

Listing 2

```
001. <service name="MathService" provider="java:RPC">
002.   <requestFlow>
003.     <handler type="java: com.sid.verifier.VerifySubscriberID"/>
003.     <handler type="java:com.xml.healer.RewritingHealerVerifier"/>
004.   </requestFlow>
005.   <responseFlow>
006.   </responseFlow>
007.   <parameter name="allowedMethods" value="add subtract multiply divide exponent"/>
008.   <parameter name="className" value="com.thesis.service.MathService"/>
009.   <parameter name="scope" value="Session"/>
010. </service>
```

As it can be seen from Listing 2, a new tag <requestFlow> is added with the previous lines. This tag contains the information of all service specific handlers in top to bottom order. When a request will come for a service, they may pass through all of these handlers in the specified order before reaching the target service. The name of two handlers is specified in the <requestFlow> tag of listing 2. The first handler may verify the subscriber ID of the request message and the second one is the RewritingHealerVerifier handler. Therefore, when a request comes for MathService it may first go to VerifySubscriberID handler. Then, if this handler processing result is positive, it may pass the request to RewritingHealerVerifier, which may verify the request SOAP message against an XML rewriting attack. In Listing 2, it can be seen that another tag <responseFlow> is added. This tag contains the name of all the handlers that should get the response message before being sent to the client.

FIG. 16.1 shows a graphical user interface of a client via which a simple client application can use the above mentioned MathService. FIG. 16.1 demonstrates that a user has to provide a subscriber's ID, a first and a second operand for an operation he wants to perform. Then the user has to select the type of operation from a list like add, subtract etc. At last, the user may press a compute button. The result of the operation is displayed at the bottom of the interface. When the user presses the compute button, the application creates a SOAP message. In this SOAP message, there may be three signed message elements, namely, the subscriber's ID, the first operand and the second operand. From FIG. 16.1 it can be seen that the user has selected subtraction operation. Therefore, the order of the operands in the SOAP message determines the result of the operation. In FIG. 16.1, it is shown that the user has given the first operand's value 16 and the second operands value 13. So the result is 3. However, if we change the order of these operands the result will be −3. After the SOAP message is fully created, the client application will give it to the RewritingHealerCreator module, which will append necessary information in it and will give it back to the client. After that the client invokes a remote service with the SOAP message. The client's code is given in Appendix B. Now it will be seen what will happen when a corresponding RewritingHealerVerifier module receives this message.

The interface of the RewritingHealerVerifier module has two parts. The left part shows the received SOAP message and the right part shows the result of different types of verification. FIG. 16.2 represents the status of the RewritingHealerVerifier module when it received the above mentioned SOAP message from the client. The bordered rectangle on the received SOAP message part of FIG. 16.2 shows the order of the two signed operands the client sent with the SOAP message. The received SOAP message part also demonstrates the information added by the RewritingHealerCreator module on the client side like the Ids of unsigned message elements, the RewritingHealer header blocks etc. The verification result part shows different verification result. The bordered rectangle on the right side of FIG. 16.2 shows the final result of the verification. This shows that no tampering was done on the received SOAP message. The verification result also demonstrates the different operations of the verification.

It is assumed now that an attacker in the middle of the client and the server intercepted the above client SOAP message and changed the order of the signed operands. For the reason as described previously, this modification may not have any effect on the signature value of those operands. Moreover, the previous solutions for an XML rewriting attack will not be able to detect this modification. Therefore, the attacker may be able to get unauthorized access to the service. The code for the attacker is given in Appendix B.

FIG. 16.3 shows the status of the RewritingHealerVerifier module when it receives the SOAP message from the attacker. The bordered rectangle in the received SOAP message part shows that the order of the operands has changed by the attacker. In the verification result part, it can be seen that the verifier module found all the information in the SignedElementInfo of the RewritingHealer header block correct. However, when it compares the computed digest value with the one present in the RewritingHealer header block, it found the attack, as the two digest values are not equal. The bordered rectangle on the verification result part shows the final verification result.

Therefore, it can be stated again, as already shown, that with the proposed method, it is not possible for an attacker to add or delete a message element to or from a SOAP message. It is also not possible for the attacker to change the depth of an element. The only modification the attacker can make is the re-ordering of elements. However, if the attacker reorders the signed message elements of a SOAP message the above shown demonstration shows that the proposed method detects this modification successfully.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

APPENDIX A

WSDL of MathService:

```
<?xml version="1.0" encoding="UTF-8"?>
<wsdl:definitions targetNamespace="http://service.thesis.com"
xmlns:apachesoap="http://xml.apache.org/xml-soap"
xmlns:impl="http://service.thesis.com"
xmlns:intf="http://service.thesis.com"
xmlns:soapenc="http://schemas.xmlsoap.org/soap/encoding/"
xmlns:wsdl="http://schemas.xmlsoap.org/wsdl/"
xmlns:wsdlsoap="http://schemas.xmlsoap.org/wsdl/soap/"
xmlns:xsd="http://www.w3.org/2001/XMLSchema">
    <!--WSDL created by Apache Axis version: 1.4
    Built on Apr 22, 2006 (06:55:48 PDT)-->
    <wsdl:message name="addRequest">
        <wsdl:part name="a" type="xsd:long"/>
        <wsdl:part name="b" type="xsd:long"/>
    </wsdl:message>
    <wsdl:message name="exponentRequest">
        <wsdl:part name="a" type="xsd:long"/>
        <wsdl:part name="b" type="xsd:long"/>
```

APPENDIX A-continued

WSDL of MathService:

```
      </wsdl:message>
      <wsdl:message name="divideRequest">
        <wsdl:part name="a" type="xsd:long"/>
        <wsdl:part name="b" type="xsd:long"/>
      </wsdl:message>
      <wsdl:message name="divideResponse">
        <wsdl:part name="divideReturn" type="xsd:long"/>
      </wsdl:message>
      <wsdl:message name="addResponse">
        <wsdl:part name="addReturn" type="xsd:long"/>
      </wsdl:message>
      <wsdl:message name="multiplyRequest">
        <wsdl:part name="a" type="xsd:long"/>
        <wsdl:part name="b" type="xsd:long"/>
      </wsdl:message>
      <wsdl:message name="subtractRequest">
        <wsdl:part name="a" type="xsd:long"/>
        <wsdl:part name="b" type="xsd:long"/>
      </wsdl:message>
      <wsdl:message name="exponentResponse">
        <wsdl:part name="exponentReturn" type="xsd:long"/>
      </wsdl:message>
      <wsdl:message name="subtractResponse">
        <wsdl:part name="subtractReturn" type="xsd:long"/>
      </wsdl:message>
      <wsdl:message name="multiplyResponse">
        <wsdl:part name="multiplyReturn" type="xsd:long"/>
      </wsdl:message>
      <wsdl:portType name="MathService">
        <wsdl:operation name="add" parameterOrder="a b">
          <wsdl:input message="impl:addRequest"
          name="addRequest"/>
          <wsdl:output message="impl:addResponse"
          name="addResponse"/>
        </wsdl:operation>
        <wsdl:operation name="divide" parameterOrder="a b">
          <wsdl:input message="impl:divideRequest"
          name="divideRequest"/>
          <wsdl:output message="impl:divideResponse"
name="divideResponse"/>
        </wsdl:operation>
        <wsdl:operation name="multiply" parameterOrder="a b">
          <wsdl:input message="impl:multiplyRequest"
name="multiplyRequest"/>
          <wsdl:output message="impl:multiplyResponse"
name="multiplyResponse"/>
        </wsdl:operation>
        <wsdl:operation name="subtract" parameterOrder="a b">
          <wsdl:input message="impl:subtractRequest"
name="subtractRequest"/>
          <wsdl:output message="impl:subtractResponse"
name="subtractResponse"/>
        </wsdl:operation>
        <wsdl:operation name="exponent" parameterOrder="a b">
          <wsdl:input message="impl:exponentRequest"
name="exponentRequest"/>
          <wsdl:output message="impl:exponentResponse"
name="exponentResponse"/>
        </wsdl:operation>
      </wsdl:portType>
      <wsdl:binding name="MathServiceSoapBinding"
      type="impl:MathService">
        <wsdlsoap:binding style="rpc"
transport="http://schemas.xmlsoap.org/soap/http"/>
        <wsdl:operation name="add">
          <wsdlsoap:operation soapAction=""/>
          <wsdl:input name="addRequest">
            <wsdlsoap:body
encodingStyle="http://schemas.xmlsoap.org/soap/encoding/"
namespace="http://service.thesis.com" use="encoded"/>
          </wsdl:input>
          <wsdl:output name="addResponse">
            <wsdlsoap:body
encodingStyle="http://schemas.xmlsoap.org/soap/encoding/"
namespace="http://service.thesis.com" use="encoded"/>
          </wsdl:output>
        </wsdl:operation>
        <wsdl:operation name="divide">
          <wsdlsoap:operation soapAction=""/>
          <wsdl:input name="divideRequest">
            <wsdlsoap:body
encodingStyle="http://schemas.xmlsoap.org/soap/encoding/"
namespace="http://service.thesis.com" use="encoded"/>
          </wsdl:input>
          <wsdl:output name="divideResponse">
            <wsdlsoap:body
encodingStyle="http://schemas.xmlsoap.org/soap/encoding/"
namespace="http://service.thesis.com" use="encoded"/>
          </wsdl:output>
        </wsdl:operation>
        <wsdl:operation name="multiply">
          <wsdlsoap:operation soapAction=""/>
          <wsdl:input name="multiplyRequest">
            <wsdlsoap:body
encodingStyle="http://schemas.xmlsoap.org/soap/encoding/"
namespace="http://service.thesis.com" use="encoded"/>
          </wsdl:input>
          <wsdl:output name="multiplyResponse">
            <wsdlsoap:body
encodingStyle="http://schemas.xmlsoap.org/soap/encoding/"
namespace="http://service.thesis.com" use="encoded"/>
          </wsdl:output>
        </wsdl:operation>
        <wsdl:operation name="subtract">
          <wsdlsoap:operation soapAction=""/>
          <wsdl:input name="subtractRequest">
            <wsdlsoap:body
encodingStyle="http://schemas.xmlsoap.org/soap/encoding/"
namespace="http://service.thesis.com" use="encoded"/>
          </wsdl:input>
          <wsdl:output name="subtractResponse">
            <wsdlsoap:body
encodingStyle="http://schemas.xmlsoap.org/soap/encoding/"
namespace="http://service.thesis.com" use="encoded"/>
          </wsdl:output>
        </wsdl:operation>
        <wsdl:operation name="exponent">
          <wsdlsoap:operation soapAction=""/>
          <wsdl:input name="exponentRequest">
            <wsdlsoap:body
encodingStyle="http://schemas.xmlsoap.org/soap/encoding/"
namespace="http://service.thesis.com" use="encoded"/>
          </wsdl:input>
          <wsdl:output name="exponentResponse">
            <wsdlsoap:body
encodingStyle="http://schemas.xmlsoap.org/soap/encoding/"
namespace="http://service.thesis.com" use="encoded"/>
          </wsdl:output>
        </wsdl:operation>
      </wsdl:binding>
      <wsdl:service name="MathServiceService">
        <wsdl:port binding="impl:MathServiceSoapBinding"
name="MathService">
          <wsdlsoap:address
location="http://localhost:8080/axis/services/MathService"/>
        </wsdl:port>
      </wsdl:service>
    </wsdl:definitions>
    Web Service Deployment Descriptor of
    Server Axis Engine
    <?xml version="1.0" encoding="UTF-8"?>
    <deployment xmlns="http://xml.apache.org/axis/wsdd/"
xmlns:java="http://xml.apache.org/axis/wsdd/providers/java">
      <globalConfiguration>
        <parameter name="adminPassword" value="admin"/>
        <parameter name="attachments.Directory"
value="D:\Tomcat\apache-tomcat-
4.1.32\webapps\axis\WEB-INF\attachments"/>
        <parameter name="sendMultiRefs" value="true"/>
        <parameter name="sendXsiTypes" value="true"/>
        <parameter name="attachments.implementation"
value="org.apache.axis.attachments.AttachmentsImpl"/>
        <parameter name="sendXMLDeclaration" value="true"/>
        <requestFlow>
          <handler type="java:org.apache.axis.handlers.JWSHandler"/>
        </requestFlow>
```

APPENDIX A-continued

WSDL of MathService:

```
        </globalConfiguration>
        <handler name="LocalResponder"
type="java:org.apache.axis.transport.local.LocalResponder"/>
        <handler name="URLMapper"
type="java:org.apache.axis.handlers.http.URLMapper"/>
        <handler name="RPCDispatcher"
type="java:org.apache.axis.providers.java.RPCProvider"/>
        <handler name="Authenticate"
type="java:org.apache.axis.handlers.SimpleAuthenticationHandler"/>
        <handler name="MsgDispatcher"
type="java:org.apache.axis.providers.java.MsgProvider"/>
        <handler name="soapmonitor"
                type="java:org.apache.axis.handlers.SOAPMonitorHandler">
          <parameter name="wsdlURL"
                value="/axis/SOAPMonitorService-impl.wsdl"/>
          <parameter name="namespace"
value="http://tempuri.org/wsdl/2001/12/SOAPMonitorService-
impl.wsdl"/>
          <parameter name="serviceName" value="SOAPMonitorService"/>
          <parameter name="portName" value="Demo"/>
        </handler>
        <service name="SOAPMonitorService" provider="java:RPC">
          <parameter name="allowedMethods" value="publishMessage"/>
          <parameter name="className"
                value="org.apache.axis.monitor.SOAPMonitorService"/>
          <parameter name="scope" value="Application"/>
        </service>
        <service name="MathService" provider="java:RPC">
          <requestFlow>
            <handler type="java:com.xml.healer.RewritingHealerVerifier"/>
          </requestFlow>
          <parameter name="allowedMethods" value="add subtract
multiply divide exponent"/>
          <parameter name="className"
                value="com.thesis.service.MathService"/>
          <parameter name="scope" value="Session"/>
        </service>
        <service name="AdminService" provider="java:MSG">
          <parameter name="allowedMethods" value="AdminService"/>
          <parameter name="enableRemoteAdmin" value="false"/>
          <parameter name="className"
                value="org.apache.axis.utils.Admin"/>
          <namespace>http://xml.apache.org/axis/wsdd/</namespace>
        </service>
        <service name="Version" provider="java:RPC">
          <parameter name="allowedMethods" value="getVersion"/>
          <parameter name="className" value="org.apache.axis.Version"/>
        </service>
        <transport name="http">
          <requestFlow>
            <handler type="URLMapper"/>
            <handler
                type="java:org.apache.axis.handlers.http.HTTPAuthHandler"/>
          </requestFlow>
        </transport>
        <transport name="local">
          <responseFlow>
            <handler
                type="java:org.apache.axis.transport.local.LocalResponder"/>
          </responseFlow>
        </transport>
      </deployment>
```

APPENDIX B

MathService Attacker Code:

```
import java.io.FileInputStream;
import org.apache.axis.client.Call;
import org.apache.axis.client.Service;
import org.apache.axis.message.SOAPEnvelope;
////This class represents an attacker of our MathService
public class Attacker {
    public Attacker( ) {
    }
```

APPENDIX B-continued

MathService Attacker Code:

```
    public static void main(String unused[ ]) throws Exception {
        ////The mofidied SOAP message is in the file
attack.xml
        FileInputStream fin = new
FileInputStream("attack.xml");
        ///Create an Envelope with the modified SOAP message
        SOAPEnvelope env = new SOAPEnvelope(fin);
        ////The endpoint of MathService
        String endpoint =
"http://localhost:8080/axis/services/MathService";
        ////Create a Service
        Service service = new Service( );
        ///Create a Call.
        Call call = (Call)service.createCall( );
        try{
            ///Set the target endpoint in the Call
            call.setTargetEndpointAddress(new
java.net.URL(endpoint));
            ///Invoke the service
            SOAPEnvelope ret= call.invoke(env);
            ///Print the response
            System.out.println(ret);
        }catch( Exception e ) {
            e.printStackTrace( );
        }
    }
}
```

What is claimed is:

1. A method for protecting a message from an XML rewriting attack when being exchanged in a distributed and decentralized network system between an initial sender and an ultimate receiver, the method comprising:

generating a message, wherein the message comprises message elements, a number of which are signed, the message elements forming a tree structure, the tree structure comprising a root called envelope and at least two children, the message having a body and a header, the header having at least a first attack preventing header block;

representing the message elements by a unique ID attribute, respectively;

sending the message from the initial sender to the ultimate receiver; and including structure specific information in the message being sent to the ultimate receiver, wherein the structure specific information is included in the first attack preventing header block and comprises:

at least a digest value of a pre-order traversal list of the tree structure, the pre-order traversal list being representative of a concatenation of the unique ID attributes of the message elements forming the tree structure; and for each signed message element targeted to the ultimate receiver the unique ID attribute, a depth, a parent's name and a parent's ID attribute, so that the ultimate receiver when receiving the message can identify any XML rewriting attack against any one of the signed message elements by comparing the structure specific information which can be derived from the received message with the structure specific information carried by the first attack preventing header block.

2. The method as in claim 1 wherein, in case the message traverses on its path from the initial sender to the ultimate receiver at least one intermediary for which the message contains signed message elements, the message comprises at least a second attack preventing header block carrying structure specific information regarding the signed message elements targeted to the at least one intermediary.

3. The method as in claim 1 wherein, in case the message traverses on its path from the initial sender to the ultimate receiver a plurality of intermediaries for each of which the message contains signed message elements, respectively, the message comprises a corresponding plurality of attack preventing header blocks, each carrying respective structure specific information regarding the signed message elements targeted to one of the intermediaries.

4. The method as in claim 3 wherein each attack preventing header block carrying information about certain signed message elements is assigned a role attribute corresponding to the role attribute of those signed message elements.

5. The method as in claim 4 wherein the pre-order traversal list used to calculate the digest value included by an attack preventing header block is based on one of a first, a second and a third tree, respectively, in dependency of the role attribute of the respective attack preventing header block.

6. The method as in claim 5 further comprising forming each attack preventing header block according to an overall structure, the structure comprising at least a group of mandatory attributes and a group of child elements, wherein the group of mandatory attributes comprises at least an attribute indicating an Id of the respective attack preventing header block, the role attribute of the respective attack preventing header block, an attribute indicating a specification of a creator node of the respective attack preventing header block, and the group of child elements comprises at least an element containing information regarding the respective signed message elements and an element containing a digest value of a pre-order traversal list of the message tree, the tree representing message elements having the same role attribute as the respective attack preventing header block.

7. The method as in claim 1 wherein the first attack preventing header block is signed.

8. The method as in claim 1 wherein an XPath expression is used to reference the first attack preventing header block from a signature element of the message.

9. The method as in claim 1 wherein each message element of the message is assigned a role attribute indicating its target server within the network system.

10. The method as in claim 9 wherein the role attribute is one of the group consisting of "initial sender"; "intermediary" and "ultimate receiver".

11. The method as in claim 10 wherein each message element is represented by a node of the tree structure of the message and each node is labeled with the respective role attribute such that a first, a second and a third tree corresponding to the respective role attributes can be extracted from the tree structure of the message.

12. The method as in claim 1 wherein the message is a SOAP message.

13. A distributed and decentralized network system configured to protect a message exchange within the system from an XML rewriting attack, the message comprising message elements, a number of which are signed message elements, the system including instructions recorded on at least one non-transitory computer-readable medium and executable by at least one processor, the system comprising:
at least an initial sender of the message that is configured to cause the at least one processor to organize the message elements in a tree structure, with a root called envelope and at least two children, the message having a body and a header, the header having a first attack preventing header block, and wherein the message elements are represented by a unique ID attribute, respectively, the message including structure specific information; and
a receiver that is configured to cause at least one processor to receive the message from the initial sender and that is configured to identify any XML rewriting attack against any one of the signed message elements by comparing the structure specific information which can be derived from the received message with the structure specific information included in the first attack preventing header block, wherein the structure specific information included in the first attack preventing header block comprises:
at least a digest value of a pre-order traversal list of the tree structure, the pre-order traversal list being representative of a concatenation of the unique ID attributes of the message elements forming the tree structure; and
for each signed message element targeted to the receiver the ID attribute, a depth, a parent's name and a parent's ID attribute.

14. The system of claim 13 further comprising at least one intermediary, wherein in case the message traverses on its path from the initial sender to the receiver through the at least one intermediary for which the message contains signed message elements, the message is provided with at least a second attack preventing header block including corresponding structure specific information regarding the signed message elements targeted to the at least one intermediary.

15. The system of claim 13 further comprising a plurality of intermediaries, wherein in case the message traverses on its path from the initial sender to the receiver through the plurality of intermediaries for each of which the message contains signed message elements, respectively, the message is provided with a corresponding plurality of attack preventing header blocks, each including respective structure specific information regarding the signed message elements targeted to one of the intermediaries, respectively.

16. The system of claim 15 wherein each attack preventing header block carrying information about certain signed message elements is assigned a role attribute corresponding to the role attribute of those signed message elements, respectively.

17. The system of claim 16 wherein the pre-order traversal list used to calculate the digest value included by an attack preventing header block is based on one of a first, a second and a third tree, respectively, in dependency of the role attribute of the respective attack preventing header block.

18. The system of claims 13 wherein the first attack preventing header blocks is signed.

19. The system of claim 13 wherein an XPath expression is used to reference the first attack preventing header block from a signature element of the message.

20. The system of claim 13 wherein each message element of the message is assigned a role attribute indicating its target server within the network system.

21. The system of claim 20 wherein the role attribute is one of the group consisting of "initial sender"; "intermediary" and "ultimate receiver".

22. The system of claim 21 wherein each message element is represented by a node of the tree structure of the message and each node is labeled with the respective role attribute such that a first, a second and a third tree corresponding to the respective role attributes can be extracted from the tree structure of the message.

23. The system of claim 13 wherein the receiver knows a priori how to compute the respective digest value based on the structure specific information derived from the received message.

24. The system of claim 13 wherein the receiver is an ultimate receiver of the message.

25. The system of claim 13 wherein the receiver is an intermediary which is passed by the message when being sent to an ultimate receiver of the message.

26. The system of claim 13 wherein the first attack preventing header block further comprises information about a point in time at which the initial sender creates the first attack preventing header block.

27. The system of claim 13 wherein the first attack preventing header block comprises an identifier for the message which can be used for correlation of responses.

28. The system of claim 13 wherein each node within the network system processing the message comprises at least one of an attack preventing creator module which can create at least one attack preventing header block, and an attack preventing verifier module, which can verify at least one attack preventing header block.

29. The system of claim 13 wherein the message is a SOAP message.

30. A system including instructions recorded on at least one non-transitory computer-readable medium and executable by at least one processor, the system comprising:

an attack preventing creator module that is configured to cause the at least one processor to create at least one attack preventing head block for a message having message elements in a tree structure with one or more of the message elements being signed, wherein the attack preventing header block includes structure specific information that comprises:
  at least a digest value of a pre-order traversal list of the tree structure, the pre-order traversal list being representative of a concatenation of unique ID attributes of the message elements forming the tree structure; and
  for each signed message element a unique ID attribute, a depth, a parent's name and a parent's ID attribute; and
an attack preventing verifier module that is configured to cause at least one processor to verify the at least one attack preventing header block by comparing the structure specific information which can be derived from the message with the structure specific information included in the first attack preventing header block.

31. The system of claim 30 wherein the message is a SOAP message.

* * * * *